(12) United States Patent
Ito

(10) Patent No.: US 7,356,223 B2
(45) Date of Patent: Apr. 8, 2008

(54) OPTICAL FILTER ELEMENT AND WAVELENGTH DIVISION MULTIPLEXING OPTICAL COUPLER

(75) Inventor: Taku Ito, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 87 days.

(21) Appl. No.: 11/334,756

(22) Filed: Jan. 17, 2006

(65) Prior Publication Data

US 2006/0159390 A1 Jul. 20, 2006

(30) Foreign Application Priority Data

| Jan. 19, 2005 | (JP) | ............................. 2005-012112 |
| Jan. 19, 2005 | (JP) | ............................. 2005-012113 |
| Jan. 19, 2005 | (JP) | ............................. 2005-012114 |
| Jan. 19, 2005 | (JP) | ............................. 2005-012115 |

(51) Int. Cl.
*G02B 6/32* (2006.01)

(52) U.S. Cl. .......................................... 385/34; 385/31

(58) Field of Classification Search .................. 385/34
See application file for complete search history.

(56) References Cited

U.S. PATENT DOCUMENTS

| 4,474,424 A | 10/1984 | Wagner .................... 350/96.16 |
| 2003/0152327 A1 | 8/2003 | Tanaka et al. ................. 385/34 |

FOREIGN PATENT DOCUMENTS

| JP | 54-17044 | 2/1979 |
| JP | 63-033707 | 2/1988 |
| JP | 01-295210 | 11/1989 |

*Primary Examiner*—Frank G. Font
*Assistant Examiner*—Mary El-Shammaa
(74) *Attorney, Agent, or Firm*—Marsh Fischmann & Breyfogle LLP

(57) ABSTRACT

An optical filter element having high isolation and reduction in reflection loss for input light beams. The optical filter element is used with a transparent substrate having a surface that includes a first area and a second area. The optical filter element has a target wavelength range. The optical filter element includes a first dielectric multilayer film arranged in the first area of the transparent substrate. A second dielectric multilayer film is arranged in the second area of the surface of the transparent substrate. The second dielectric multilayer film has a reflectance of a predetermined value or less for a light beam having a wavelength in the target wavelength range. A portion of the second dielectric multilayer film and a portion of the first dielectric multilayer film are laminated each other.

31 Claims, 28 Drawing Sheets

OPTICAL FILTER ELEMENT AND WAVELENGTH DIVISION MULTIPLEXING OPTICAL COUPLER

CROSS-REFERENCE TO RELATED APPLICATIONS

This application is based upon and claims the benefit of priority from prior Japanese patent application Nos. 2005-012112, 2005-012113, 2005-012114, and 2005-012115, filed on Jan. 19, 2005, the entire contents of which are incorporated herein by reference.

BACKGROUND OF THE INVENTION

The present invention relates to an optical filter element, and more particularly, to an optical filter element for a wavelength division multiplexing optical coupler and a wavelength division multiplexing optical coupler that uses an optical filter element.

A passive optical network (PON) is an FTTX (fiber to the x, where x is home, curb, etc.) network architecture in which optical signals are used for communications between a single station and a plurality of subscribers. In the PON architecture, an upstream signal that is transmitted from each subscriber to the station differs in wavelength from a downstream signal that is transmitted from the station to each subscriber. Further, an analog signal (image signal) that differs in wavelength from an upstream signal and a downstream signal may be multiplexed over an upstream signal or a downstream signal. An upstream signal may use light having a wavelength of 1310 nm, and a downstream signal may use light having a wavelength of 1490 nm or 1550 nm.

An optical line terminal (OLT) or an optical network unit (ONU) is arranged at the station and at each subscriber. Each of the OLT and the ONU needs a wavelength division multiplexing optical coupler for demultiplexing or multiplexing optical signals of a plurality of wavelengths.

FIG. 1 shows a conventional wavelength division multiplexing optical coupler 200. The optical coupler 200 includes an optical filter 206 having a predetermined transmission wavelength range. The optical filter 206 multiplexes and demultiplexes two wavelengths λ1 and λ2. The optical coupler 200 receives input light beams, into which light beams having different wavelengths λ1 and λ2 are multiplexed, from an input optical fiber 201. A lens 204 converts the input light beams into collimated light beams. The optical filter 206 reflects, toward the lens 204, light beams having the wavelength λ1 included in the collimated light beams. The reflected light beams are focused on a first output optical fiber 202 by the lens 204. The optical filter 206 transmits light beams having the wavelength λ2. The transmitted light beams are focused on a second output optical fiber 203 by a lens 205. The input optical fiber 201 functions as a common port of the optical coupler 200. The output optical fiber 202 functions as a reflected light output port. The output optical fiber 203 functions as a transmitted light output port. The optical coupler 200 is also referred to as a three-port coupler.

Japanese Laid-Open Patent Publication No. 1-295210 describes a three-port coupler including a dual collimator, a single collimator, and a bandpass filter. The dual collimator includes two optical fibers and a collimation lens. The single collimator includes a single optical fiber and a collimation lens. The bandpass filter is arranged between the two collimators.

Japanese Laid-Open Patent Publication No. 63-33707 describes a three-port coupler including an optical waveguide and a bandpass filter. The optical waveguide includes a Y-shaped branching portion. The bandpass filter is arranged on the branched portion of the optical waveguide.

Japanese Laid-Open Patent Publication No. 2003-240960 describes a three-port coupler using a gradient index rod lens as a collimation lens. The gradient index rod lens has a flat end face and is easily assembled together with an optical filter or an optical fiber. This structure enables the coupler to be downsized Examples of optical filters include bandpass filters and edge filters (long wave transmission or short wave transmission filters). A bandpass filter selectively transmits light beams in a predetermined wavelength range. The transmission wavelength range of an edge filter is defined by two edge wavelengths (shortest wavelength and longest wavelength of the transmission wavelength range).

Japanese Laid-Open Patent Publication No. 54-17044 and U.S. Pat. No. 4,474,424 describe couplers that multiplex and demultiplex signals of three or more wavelengths.

Isolation for crosstalk attenuation is important in conventional wavelength division multiplexing optical couplers. Isolation is an index indicates the amount of light of which wavelength is not included in a predetermined wavelength range and which mixes with light beams that are provided to a reflected light output port or transmitted light output port. A higher isolation represents a lower amount of light that is not included in the predetermined wavelength range, and a lower isolation represents a higher amount of light that is included in the predetermined wavelength range.

Conventional optical filters fail to avoid reflection residues. Reflection residues lower the isolation of the reflected light output port of the filter. The reflected light output port included in the conventional optical coupler has an isolation of about 12 dB. The reflected light output port has an isolation of about 18 dB even when the transmission ripple is optimized. It is desirable to improve the isolation of all ports of the wavelength division multiplexing optical coupler to, for example, 20 dB or more.

SUMMARY OF THE INVENTION

It is an object of the present invention to provide an optical filter element that has a high isolation and reduces reflection loss of input light beams, and is used for a compact and low-cost wavelength division multiplexing optical coupler. It is another object of the present invention to provide a wavelength division multiplexing optical coupler that uses such an optical filter element.

One aspect of the present invention is an optical filter element having a target wavelength range and for use with a transparent substrate having a surface that includes a first area and a second area. The optical filter element includes a first dielectric multilayer film arranged in the first area of the surface of the transparent substrate. A second dielectric multilayer film is arranged in at least the second area of the surface of the transparent substrate. The second dielectric multilayer film has a reflectance of a predetermined value or less for a light beam having a wavelength in the target wavelength range. A portion of the second dielectric multilayer film and a portion of the first dielectric multilayer film are laminated each other.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An optical filter element 100 and a wavelength division multiplexing optical coupler 1 according to a first embodiment of the present invention will now be described.

Figure 1:
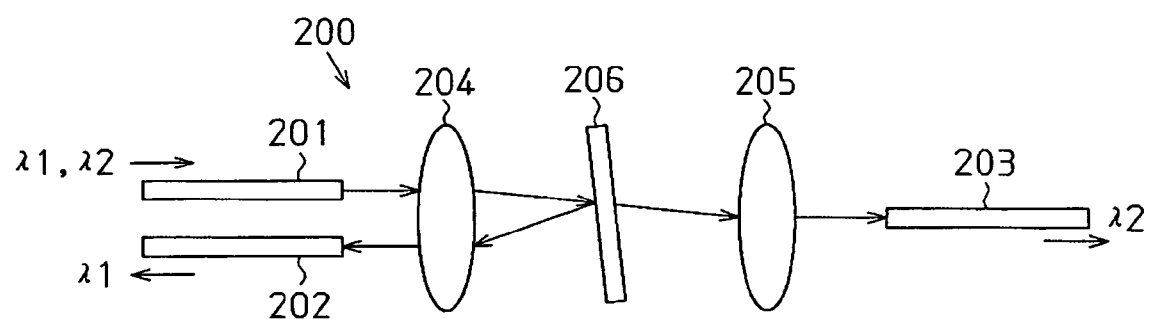
FIG. 1 is a schematic diagram of a conventional wavelength division multiplexing optical coupler.
Figure 2:
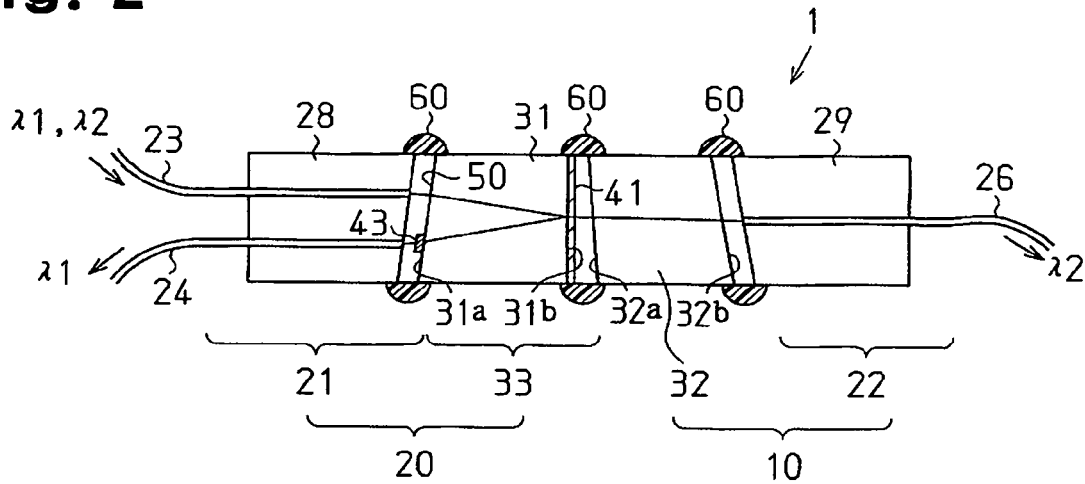
FIG. 2 is a schematic diagram of a wavelength division multiplexing optical coupler according to a first embodiment of the present invention.

As shown in FIG. 2, the wavelength division multiplexing optical coupler 1 is designed to handle two wavelengths. The coupler 1 receives input light beams (wavelength division multiplexed signals), into which a plurality of optical signals of different wavelengths (e.g., λ1 and λ2) are multiplexed, via a common port or an input optical fiber 23. The coupler 1 then splits (demultiplexes) the input light beams into a plurality of optical signals and allocates the optical signals to a plurality of ports or optical fibers 24 and 26.

The coupler 1 is optically coupled to the input optical fiber 23. The coupler 1 includes a gradient index rod lens 31 functioning as a first lens, a gradient index rod lens 32 functioning as a second lens that is optically coupled to the rod lens 31, the first output optical fiber (reflected light output port) 24 that is optically coupled to the rod lens 31, and the second output optical fiber (transmitted light output port) 26 that is optically coupled to the rod lens 32.

Figure 3A:
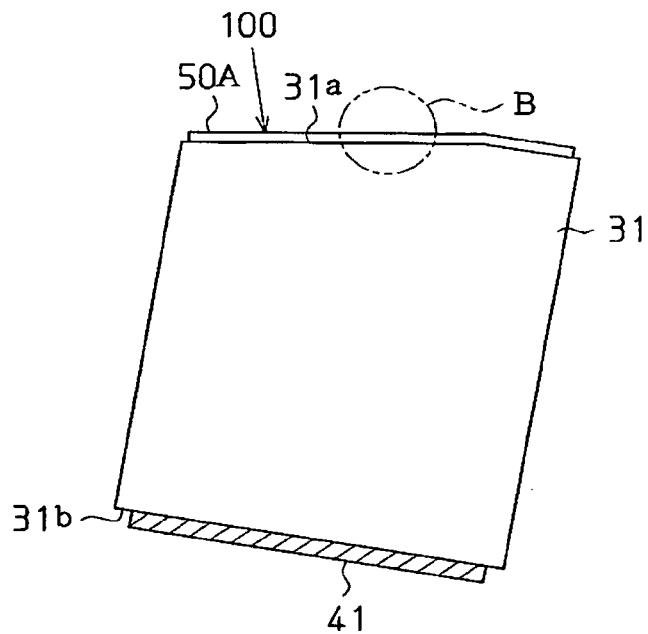
FIG. 3A is a side view of a first lens included in the coupler of FIG. 2.
Figure 3B:
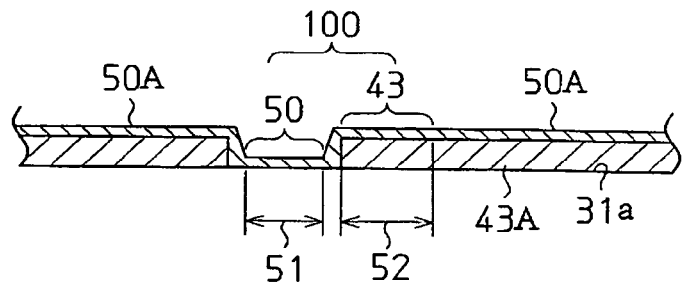
FIG. 3B is an enlarged view of an optical filter element according to the first embodiment.

The rod lens 31 includes a first end face 31a facing the input optical fiber 23 and a second end face 31b facing the rod lens 32. A first optical filter 41 is directly formed on the second end face 31b. The first optical filter 41 reflects light beams having a first wavelength $\lambda 1$ included in the input light beams, and transmits light beams having a second wavelength $\lambda 2$ included in the input light beams. The light beams having the first wavelength $\lambda 1$ reflected by the first optical filter 41 are emitted from the first end face 31a of the rod lens 31 and focused at a first position. The first output optical fiber 24 has an end face at the first position and receives the focused light beams having the first wavelength $\lambda 1$. As shown in FIG. 3b, the optical filter element 100 is formed on the first end face 31a of the first lens 31. A portion of the optical filter element 100 functions as a filter unit (second optical filter) 43. Another portion of the optical filter element 100 functions as an antireflection unit (antireflection coating) 50. The second optical filter 43 produces a desired filter effect together with the first optical filter 41. The rod lens 32 focuses the light beams having the second wavelength $\lambda 2$ that have been transmitted by the first optical filter 41 at a second position. The second output optical fiber 26 has an end face at the second position and receives the focused light beams having the second wavelength $\lambda 2$.

As one example, the input light beams are two-wavelength division multiplexed signals. The first wavelength $\lambda 1$ is 1310 nm. The second wavelength $\lambda 2$ is 1550 nm. In this case, the input optical fiber 23 sends the input light beams into the first end face 31a of the first lens 31. The coupler 1 demultiplexes the input light beams into an optical signal of a wavelength of 1310 nm and an optical signal of a wavelength of 1550 nm, and outputs the 1310 nm optical signal from the first output optical fiber 24 and the 1550 nm optical signal from the second output optical fiber 26.

The coupler 1 further includes capillaries 28 and 29. The capillary 28 supports the optical fibers 23 and 24. The capillary 29 supports the optical fiber 26. The capillary 28 is a glass tube having two support holes. The optical axes (core central axes) of the optical fibers 23 and 24 that are supported by the capillary 28 are parallel to each other. The optical fibers 23 and 24 and the capillary 28 form a dual optical fiber pigtail 21. The end face 31a of the first lens 31 faces an end face of the dual optical fiber pigtail 21. The end face of the dual optical fiber pigtail 21 and the end face 31a of the first lens 31 are tilted at an angle of 4 to 8 degrees with respect to the optical axis. The tilted end faces prevent light beams reflected thereon from returning to the optical fiber 23. It is preferable that the end faces of the dual optical fiber pigtail 21 and the first lens 31 be substantially parallel to each other to facilitate assembly.

The first lens 31 converts the input light beams into collimated light beams. The first lens 31 focuses, on the end face of the optical fiber 24, collimated light beams that are reflected by the optical filter 41 on the second end face 31b. In this way, the dual optical fiber pigtail 21 and the first lens 31 are combined to form a dual optical fiber collimator 20.

The optical fiber 26 and the capillary 29 form a single optical fiber pigtail 22. An end face 32b of the second lens 32 faces an end face of the single optical fiber pigtail 22. The end face of the single optical fiber pigtail 22 and the end face 32b of the second lens 32 are tilted at an angle of 4 to 8 degrees with respect to the optical axis. The tilted end faces prevent light beams reflected thereon from returning to the optical fiber 23. It is preferable that the end faces of the single optical fiber pigtail 22 and the second lens 32 be parallel to each other to facilitate assembly.

The second lens 32 receives the collimated light beams on its end face 32a and focuses the collimated light beams on the end face of the optical fiber 26. The single optical fiber pigtail 22 and the second lens 32 are combined to form a single optical fiber collimator 10.

The first lens 31 is arranged so that its second end face 31b faces the end face 32a of the second lens 32. As a result, the collimated light beams are focused at a position between the dual optical fiber collimator 20 and the single optical fiber collimator 10.

The coupler 1 includes the first and second optical filters 41 and 43. The first and second optical filters 41 and 43 function as edge filters. Each of the first and second optical filters 41 and 43 has a laminated structure. The first optical filter 41 is arranged between the first lens 31 and the second lens 32. The second optical filter 43 is arranged between the first lens 31 and the optical fiber 24. For example, the first optical filter 41 is formed directly on the second end face 31b of the first lens 31, and the second optical filter 43 is formed directly on the first end face 31a of the first lens 31. The first lens 31 and the first and second optical filters 41 and 43 form a filter-incorporating lens 33.

The first optical filter 41 reflects light beams having the first wavelength $\lambda 1$ and transmits light beams having the second wavelength $\lambda 2$. The film structure of the first optical filter 41 is determined so that the isolation of transmitted light relative to reflected light is 40 dB or greater. The light reflected by the first optical filter 41 includes a small amount of light of which the wavelength is in a transmission wavelength range (reflection residue elements) Such reflection residue elements lower the actual isolation (reflection isolation) of the light beams having the wavelength $\lambda 1$ relative to the light beams having the wavelength $\lambda 2$ at the reflected light output port below its design value of 40 dB. As a result, the actual isolation is about 12 dB. The reflection isolation indicates the amount of light that does not have the wavelength $\lambda 1$ and that travels together with the light beams having the wavelength $\lambda 1$ that are reflected by the first optical filter 41.

The second optical filter 43 transmits light beams having the first wavelength of $\lambda 1$, and reflects light beams having the second wavelength $\lambda 2$. FIG. 3B is an enlarged view of portion B in FIG. 3A. As shown in FIG. 3B, on the first end face 31a of the first lens 31, the second optical filter 43 is formed in a light exiting area 52 through which light beams (output light beams) that are reflected by the first optical filter 41 pass, but is not formed in a light incident area (light entering area) 51 through which the input light beams of the optical fiber 23 pass.

The second optical filter 43 and the first optical filter 41 cooperate to produce a desired filter effect. Thus, the second optical filter 43 is only required to filter reflected light beams of the first optical filter 41. As one example, the first optical filter 41 and the second optical filter 43 may together need to achieve an isolation of 40 dB or greater in total. The first optical filter 41 has a reflection isolation of about 12 dB. Thus, in this case, the second optical filter 32 is only required to have a transmission isolation of 30 dB or less. As a result, a low-cost optical filter having lower properties than that for the first optical filter 41 may be used for the second optical filter 43. The transmission isolation indicates the amount of light that does not have the wavelength λ1 and that travels together with the light beams having the first wavelength λ1 that are transmitted by the second optical filter 43.

The antireflection coating 50 is arranged in the light incident area 51 on the first end face 31a of the lens 31. The antireflection coating 50 reduces loss (return loss) caused by reflection of the input light beams that are provided from the optical fiber 23. The film structure of the antireflection coating 50 is determined to have a reflectance of a predetermined value (e.g., 0.5%) or less throughout a target wavelength range (usable wavelength range) of the coupler 1, for example, throughout a range of 1250 to 1650 nm.

The optical filter element 100, which includes the second optical filter 43 and the antireflection coating 50 that are formed integrally, is arranged on the first end face 31a of the first lens 31.

With a conventional manufacturing method, an optical filter and an antireflection coating having different film structures are formed separately. In the present invention, the light incident area 51 is spaced from the light exiting area 52 only by about 100 μm. If the conventional manufacturing method including masking is used to manufacture the optical filter element 100 of the present invention, the mask is expanded by heating during film formation, and the masking accuracy decreases. The conventional manufacturing method fails to manufacture the optical filter element 100 of the present invention with high accuracy. A liftoff method including application of a mask (masking layer) requires a masking layer to be applied, formed, and removed every time a single film is formed. With the liftoff method, the number of steps increases as the number of films to be formed on one end face increases. The liftoff method complicates the manufacturing processes for the optical filter element 100.

The second optical filter 43 is formed by laminating a first dielectric multilayer film 43A and a second dielectric multilayer film 50A. First, the first dielectric multilayer film 43A is formed on a portion of the end face 31a of the first lens 31 excluding the light incident area 51 and including at least the light exiting area 52. The second dielectric multilayer film 50A is then formed throughout the first end face 31a. A portion of the second dielectric multilayer film 50A is on the first dielectric multilayer film 43A. A portion of the second dielectric multilayer film 50A that is formed in the light incident area 51 functions as the antireflection coating 50. As a result, only the antireflection coating 50 is formed in the light incident area 51, and the second optical filter 43 having a laminated structure of the first dielectric multilayer film 43A and the second dielectric multilayer film 50A is formed in the light exiting area 52 as shown in FIG. 3B. The entire film structure of the second optical filter 43 including the first dielectric multilayer film 43A and the second dielectric multilayer film 50A is adjusted in a manner that the second optical filter 43 has the desired filter properties.

The first dielectric multilayer film 43A and the second dielectric multilayer film 50A are formed in a manner such that the second optical filter 43 transmits or reflects light beams having wavelengths in a predetermined wavelength range. The second optical filter 43 at least transmits light beams having the wavelength λ1. The second dielectric multilayer film 50A is formed in a manner that the antireflection coating 50 has a reflectance of a predetermined value (e.g., 0.5%) or less throughout the target wavelength range (refer to FIG. 7). The second dielectric multilayer film 50A is common to the second optical filter 43 and the antireflection coating 50. In other words, a surface portion of the second optical filter 43 that is farther from the first end face 31a has the same film structure as the antireflection coating 50.

A manufacturing method for the coupler 1 will now be described.

As shown in FIG. 2, an epoxy resin 60 is applied to the side surfaces of the filter-incorporating lens 33 and the dual optical fiber pigtail 21. The filter-incorporating lens 33 and the dual optical fiber pigtail 21 are connected together with a small gap left between them. The filter-incorporating lens 33 and the dual optical fiber pigtail 21 are fixed in that state. The fiber collimator 20, the second lens 32, and the single optical fiber pigtail 22 are aligned with each other in a manner that light beams having the second wavelength λ2 that are transmitted by the first optical filter 41 are focused on the optical fiber 26 with minimum loss, and that a small gap remains between the second lens 32 and the single optical fiber pigtail 22. In the aligned state, the fiber collimator 20, the second lens 32, and the single optical fiber pigtail 22 are connected to one another with the epoxy resin 60.

The optical components of the coupler 1 that have been aligned and fixed are accommodated in a protective case. This completes the coupler 1. As one example, the protective case may be a small-sized tube having a diameter of several millimeters and a length of several tens of millimeters.

A manufacturing method for the optical filter element 100 will now be described with reference to FIGS. 4 and 5.

Figure 4A:
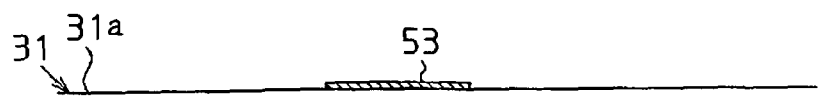
FIGS. 4A to 4D are schematic diagrams showing procedures for manufacturing the optical filter element of FIG. 3B.

[Process 1: FIG. 4A]

The light incident area 51 on the first end face 31a of the first lens 31 is locally masked. The masking includes formation of a masking layer 53 by applying a masking paint (e.g., a masking resin) to the light incidents area 51.

Figure 4B:
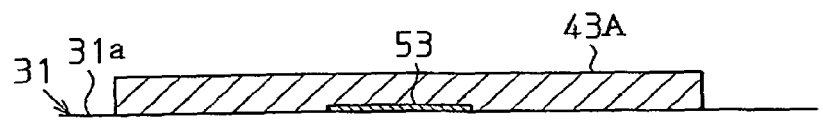

[Process 2: FIG. 4B]

The first dielectric multilayer film 43A is formed on the first end face 31a. A portion of the first dielectric multilayer film 43A is formed on the masking layer 53.

Figure 4C:

[Process 3: FIG. 4C]

The masking layer 53 and the portion of the first dielectric multilayer film 43A formed on the masking layer 53 are selectively removed at the same time.

Figure 4D:
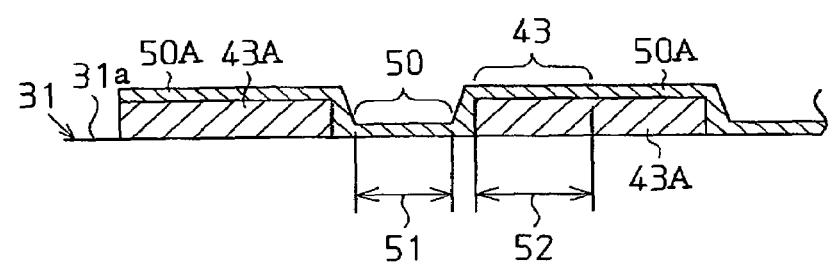

[Process 4: FIG. 4D]

The second dielectric multilayer film 50A is formed on the first dielectric multilayer film 43A throughout the first end face 31a.

With the processes 1 to 4, the antireflection coating 50 is formed locally in the light incident area 51. As a result, the second optical filter 43 having the laminated structure of the first dielectric multilayer film 43A and the second dielectric multilayer film 50A is formed in the light exiting area 52.

Example 1 according to the first embodiment will now be described.

The coupler 1 of example 1 has the properties described below as its target specifications. The properties comply with B-PON (broadband passive optical network) standards.

Transmission isolation of 40 dB or greater (wavelength range: 1260 to 1360 nm, 1480 to 1500 nm)

Reflection isolation of 40 dB or greater (wavelength range: 1550 to 1565 nm)

Transmission insertion loss of 0.7 dB or less (wavelength range: 1260 to 1360 nm, 1480 to 1500 nm)

Reflection insertion loss of 0.7 dB or less (wavelength range: 1550 to 1565 nm)

Figure 6:
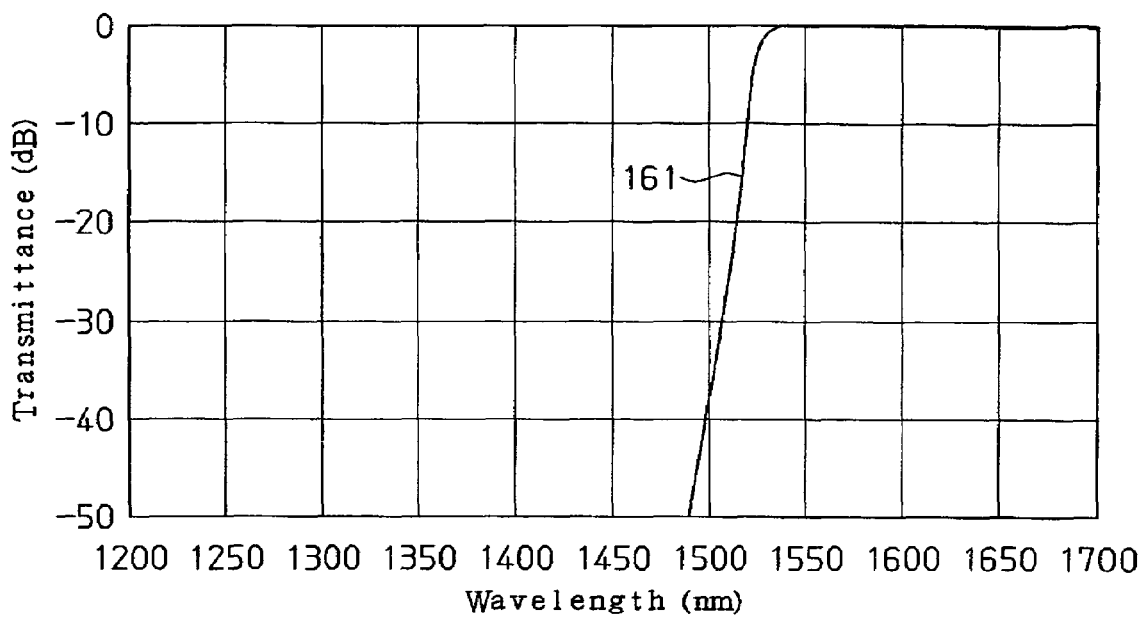
FIG. 6 is a graph showing theoretical properties of a first optical filter.

In example 1, the first lens 31 is a gradient index rod lens having a diameter of 1.8 mm. The first optical filter 41 is an edge filter that reflects light beams having wavelengths of 1310 nm and 1490 nm, and transmits light beams having a wavelength of 1530 nm. The first optical filter 41 is a dielectric multilayer film in which $SiO_2$ layers and $TiO_2$ layers are alternately laminated to form 74 layers in total. Curve 161 in FIG. 6 shows theoretical properties of the first optical filter 41.

The first dielectric multilayer film 43A is an edge filter that transmits light beams having wavelengths of 1310 nm and 1490 nm, and reflects light beams having a wavelength of 1530 nm. The first dielectric multilayer film 43A is formed by alternately laminating $SiO_2$ layers and $TiO_2$ layers of 76 layers in total on the first end face 31a. In Table 1, numerals 1 to 76 show the film structure of the first dielectric multilayer film 43A. Letter S indicates that the layer is an $SiO_2$ layer, and letter T indicates that the layer is a $TiO_2$ layer. The numerical values each show the optical film thickness of the layer (in $\lambda/4$ units).

Figure 7:
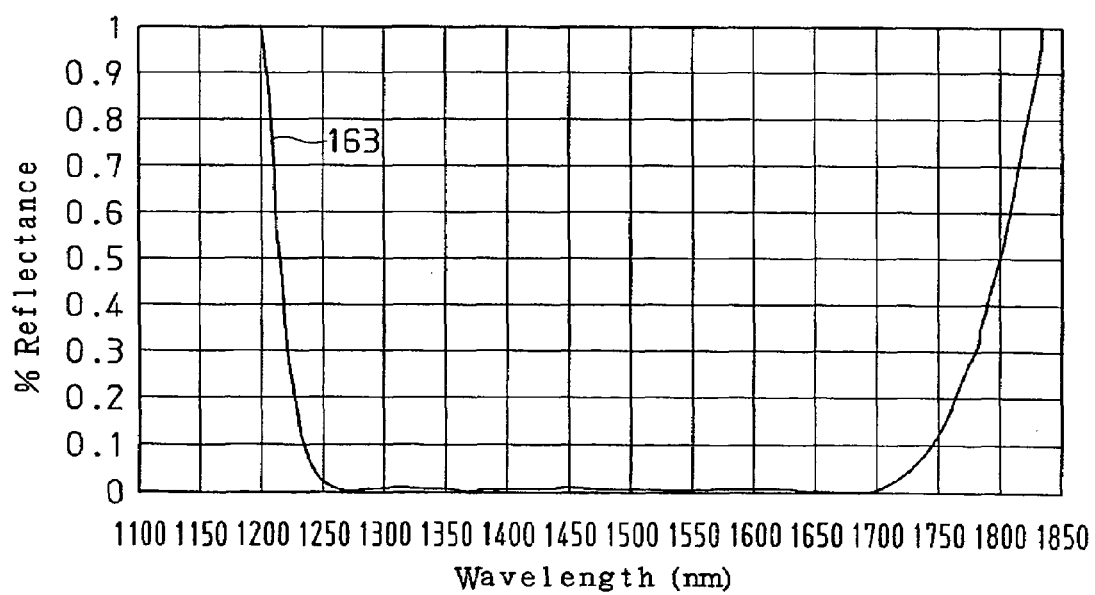
FIG. 7 is a graph showing theoretical properties of an antireflection coating.

The second dielectric multilayer film 50A is formed by alternately laminating $SiO_2$ layers and $TiO_2$ layers of 11 layers in total. In Table 1, numerals 77 to 87 show the film structure of the second dielectric multilayer film 50A. Curve 163 in FIG. 7 shows theoretical properties of the second dielectric multilayer film 50A. The $SiO_2$ layers and the $TiO_2$ layers of the second dielectric multilayer film 50A are formed from the same materials as the $SiO_2$ layers and the $TiO_2$ layers of the first dielectric multilayer film 43A.

Figure 8:
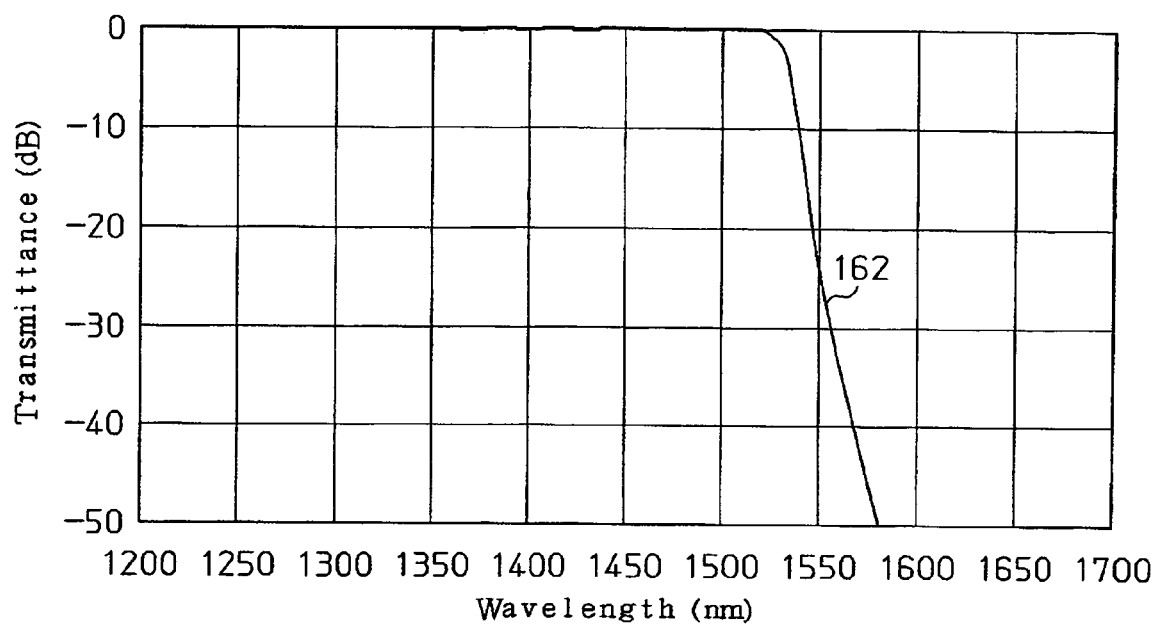
FIG. 8 is a graph showing theoretical properties of a second optical filter.

As a result, the second optical filter 43 is formed by alternately laminating $SiO_2$ layers and $TiO_2$ layers of 87 layers in total. The design wavelength of the second optical filter 43 is 1650 nm. The layer with numeral 1 in Table 1 is the lowest layer close to the first end face 31a. The layer denoted by numeral 87 in Table 1 is the highest layer far from the first end face 31a. Curve 162 in FIG. 8 shows theoretical properties of the second optical filter 43.

TABLE 1

| 1 | 0.7956S | 2 | 0.0448T | 3 | 0.502S | 4 | 1.4125T | 5 | 1.1294S |
|---|---|---|---|---|---|---|---|---|---|
| 6 | 1.4611T | 7 | 0.2827S | 8 | 1.5589T | 9 | 0.6937S | 10 | 1.5325T |
| 11 | 0.5847S | 12 | 1.462T | 13 | 0.5746S | 14 | 1.5299T | 15 | 0.5416S |
| 16 | 1.4406T | 17 | 0.6713S | 18 | 1.5025T | 19 | 0.5111S | 20 | 1.4689T |
| 21 | 0.5629S | 22 | 1.505T | 23 | 0.5781S | 24 | 1.4786T | 25 | 0.5536S |
| 26 | 1.5003T | 27 | 0.5157S | 28 | 1.5233T | 29 | 0.5307S | 30 | 1.5027T |
| 31 | 0.4673S | 32 | 1.5372T | 33 | 0.5469S | 34 | 1.4805T | 35 | 0.5351S |
| 36 | 1.5152T | 37 | 0.5654S | 38 | 1.478T | 39 | 0.4945S | 40 | 1.4847T |
| 41 | 0.642S | 42 | 1.4295T | 43 | 0.6327S | 44 | 1.4337T | 45 | 0.6348S |
| 46 | 1.4238T | 47 | 0.6471S | 48 | 1.4545T | 49 | 0.5784S | 50 | 1.4769T |
| 51 | 0.5397S | 52 | 1.5087T | 53 | 0.5181S | 54 | 1.4752T | 55 | 0.5991S |
| 56 | 1.475T | 57 | 0.6255S | 58 | 1.4711T | 59 | 0.5205S | 60 | 1.4828T |
| 61 | 0.628S | 62 | 1.4755T | 63 | 0.6172S | 64 | 1.4795T | 65 | 0.5598S |
| 66 | 1.5792T | 67 | 0.5737S | 68 | 1.6112T | 69 | 0.204S | 70 | 1.7117T |
| 71 | 0.401S | 72 | 1.4844T | 73 | 1.4399S | 74 | 2.0799T | 75 | 0.2842S |
| 76 | 0.2918T | 77 | 0.9515S | 78 | 0.1041T | 79 | 0.5818S | 80 | 0.8527T |
| 81 | 0.1368S | 82 | 0.6585T | 83 | 1.0677S | 84 | 0.268T | 85 | 0.3261S |
| 86 | 0.9698T | 87 | 0.8835S | | | | | | |

A method for forming the optical filter element 100 of example 1 will now be described.

Figure 5:
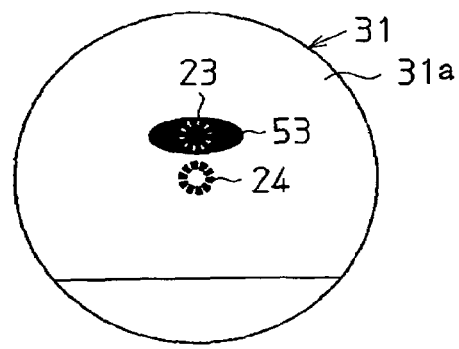
FIG. 5 is an explanatory diagram showing the masking process of FIG. 4A.

As shown in FIGS. 4A and 5, a masking paint is first applied to locally cover the light incident area 51 so as to form a masking layer 53. Then, the first dielectric multilayer film 43A is formed (refer to FIG. 4B). The masking layer 53 is removed using an organic solvent (refer to FIG. 4C). As a result, the portion of the first dielectric multilayer film 43A formed on the masking layer 53 is also removed. Finally, the second dielectric multilayer film 50A is formed on the entire first end face 31a.

Figure 9:
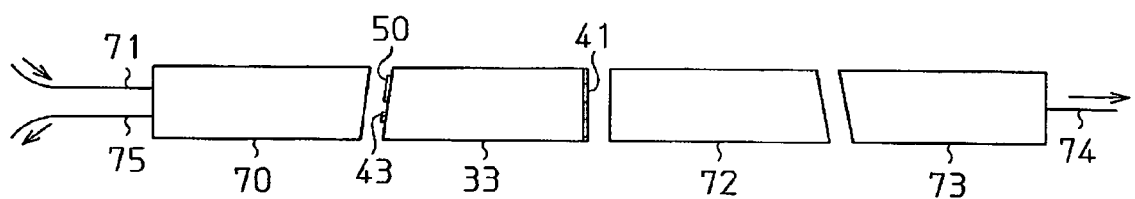
FIG. 9 is a schematic diagram of an assessment optical system for a filter-incorporating lens.

This manufactures the filter-incorporating lens 33 including the first optical filter 41, the second optical filter 43, and the antireflection coating 50, which are formed integrally. The properties of the filter-incorporating lens 33 are assessed using an assessment optical system as shown in FIG. 9.

The assessment optical system includes a dual optical fiber pigtail 70 having a light input port 71, a collimation lens 72, and a single optical fiber pigtail 73. The dual optical fiber pigtail 70 inputs test light into the antireflection coating 50 of the filter-incorporating lens 33. As one example, the test light may be light beams into which light beams having the wavelengths $\lambda 1$ and $\lambda 2$ are multiplexed. The collimation lens 72 receives light beams, which are transmitted by the first optical filter 41 of the filter-incorporating lens 33, and converges the received light beams on the single optical fiber pigtail 73. The single optical fiber pigtail 73 outputs the light beams from the transmitted light output port 74. In example 1, the transmitted light output port 74 outputs light beams having the wavelength $\lambda 2$. The intensity of the output light beams is measured.

The light beams reflected by the first optical filter 41 are transmitted by the second optical filter 43, and are output from the reflected light output port 75 of the dual optical fiber pigtail 70. In example 1, the reflected light output port 75 output light beams having the wavelength $\lambda 1$. The intensity of the output light beams was measured.

Figure 10A:
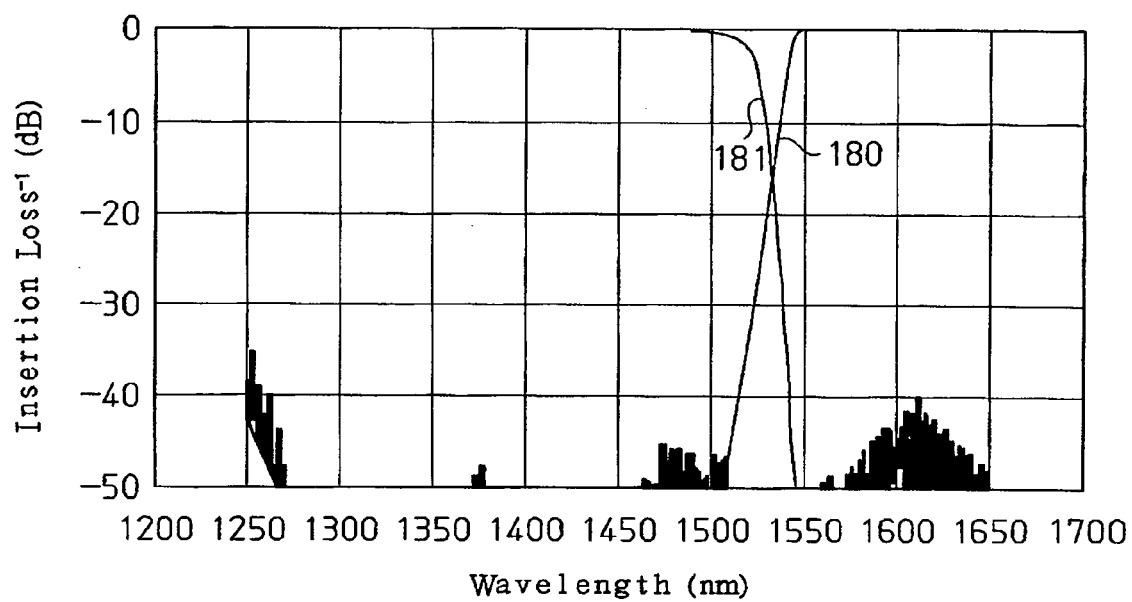
FIG. 10A is a graph showing results of measurement performed using the optical system.
Figure 10B:
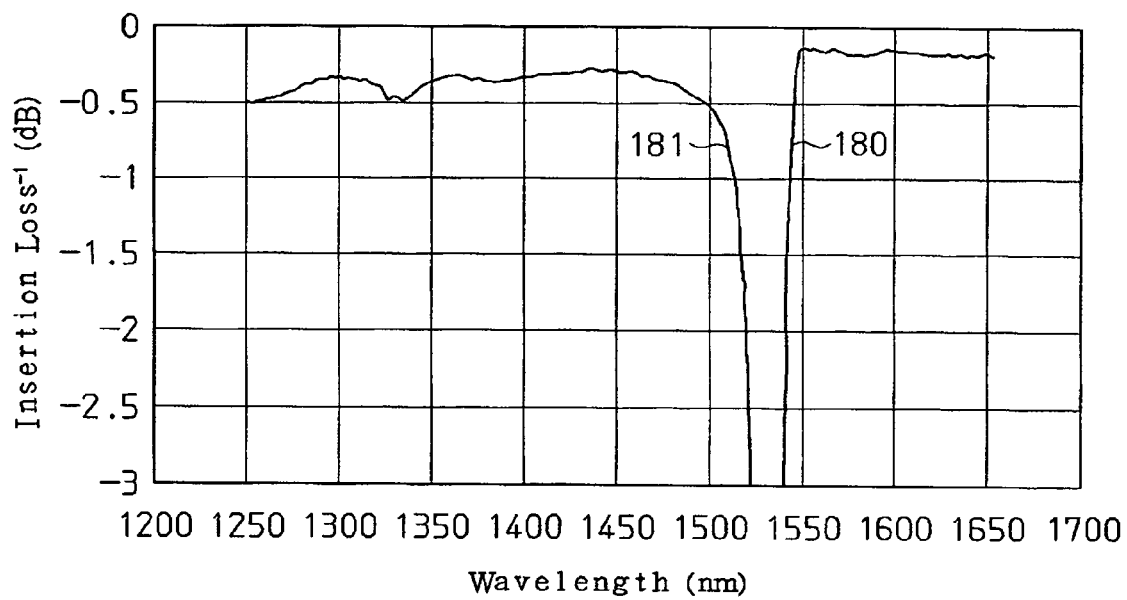
FIG. 10B is an enlarged view showing a low-loss portion of the graph of FIG. 10A.

FIGS. 10A and 10B show the assessment results. FIG. 10B is an enlarged view of FIG. 10A. Curve 180 shows the insertion loss of the output light (light beams having the wavelength $\lambda 2$) of the transmitted light output port 74. Curve 181 shows the insertion loss of the output light (light beams having the wavelength $\lambda 1$) of the reflected light output port 75. The assessment results reveal that the target specifications described above were achieved at the ports 74 and 75.

The first embodiment has the advantages described below.

The optical filter element 100 includes the second optical filter 43 and the antireflection coating 50 that are formed integrally. A portion of the second optical filter 43 has the same film structure as the antireflection coating 50. The antireflection coating 50 is formed simply by forming the second dielectric multilayer film 50A. The antireflection coating 50 and the second-optical filter 43 are easily formed in the light incident area 51 and the light exiting area 52 on the first end face 31a without requiring the second dielectric multilayer film 50A to be processed. This structure lowers the manufacturing cost of the optical filter element 100.

The second optical filter 43 that transmits light beams having the first wavelength $\lambda 1$ and reflects light beams that does not have the first wavelength $\lambda 1$ is arranged on the first end face 31a of the first lens 31. The second optical filter 43 eliminates reflection residue elements that are included in the reflected light from the first optical filter 41. This reduces the amount of light that does not have the first wavelength $\lambda 1$ and that travels together with the output light output from the reflected light output port. As a result, the isolation of the reflected light output port is increased.

The second optical filter 43 has a laminated structure of the first dielectric multilayer film 43A and the second dielectric multilayer film 50A. The antireflection coating 50 is formed by the second multilayer film 50A. Masking is not required when the second dielectric multilayer film 50A is formed. Masking is required only when the first dielectric multilayer film 43A is formed This simplifies the manufacturing processes for the optical filter element including the optical filter for improving the isolation of the reflected light output port and the antireflection coating for reducing the reflection loss of the input light beams.

The second optical filter 43 selectively transmits light beams having the first wavelength λ1 included in the reflected light beams that are demultiplexed by the first optical filter. This structure improves the isolation of the reflected light output port without affecting the input light beams.

The first lens 31 is a gradient index rod lens. The input optical fiber 23 and the first output optical fiber 24 are supported by the capillary 28 in a manner that their core central axes are parallel to each other. As a result, the first lens 31, the input optical fiber 23, and the first output optical fiber 24 are arranged substantially along a straight line. As a result, the coupler 1 is compact and easily assembled.

The first lens 31 is a gradient index rod lens and has the end face 31b, which is flat. Thus, the first optical filter 41 is easily placed in contact with the second end face 31b of the first lens 31.

The gradient index rod lens is easily processed to have an end face tilted with respect to the optical axis. As a result, the angle of the first optical filter 41 with respect to the optical axis is easily adjusted.

The filter-incorporating lens 33 includes the first optical filter 41 that is formed directly on the second end face 31b of the first lens 31. This reduces the number of components for the coupler 1. As a result, the coupler 1 can be easily assembled.

The first dielectric multilayer film 43A is formed directly on the first end face 31a of the first lens 31. This reduces the number for components of the coupler 1. As a result, the coupler 1 can be easily assembled.

The dual optical fiber pigtail 21 includes the input optical fiber 23 and the first output optical fiber 24 that are supported by the capillary 28. Thus, the optical fibers 23 and 24 can be easily handled and easily aligned with each other.

The coupler 1 includes the second lens 32 and the second output optical fiber 26. The second lens 32 receives light beams on the end face 32a, outputs the light beams from the end face 32b, and focuses the light beams. The second output optical fiber 26 receives the light beams focused by the second lens 32. This structure enables the coupler 1 to output light (λ2) that is transmitted by the first optical filter 41.

When the wavelength range of the first wavelength λ1 is 1260 to 1360 nm and the wavelength range of the second wavelength λ2 is 1550 to 1560 nm, the coupler 1 transmits upstream and downstream signals and analog image signals for FTTx in a wavelength range suitable for the existing optical fiber networks.

The second optical filter 43 is formed in the light exiting area 52 and the antireflection coating 50 is formed only in the light incident area 51 by locally removing the portion of the first dielectric multilayer film 43A covering the light incident area 51 of the first lens 31.

A coupler 1 according to a second embodiment of the present invention will now be described focusing on its differences from the first embodiment. The coupler 1 includes an optical filter element 100 shown in FIG. 11.

A second dielectric multilayer film 50A for reducing reflection loss of input light beams is formed over the entire first end face 31a of a first lens 31. A portion of the second dielectric multilayer film 50A formed in a light incident area 51 functions as an antireflection coating 50. A first dielectric multilayer film 43A is formed on a portion of the second dielectric multilayer film 50A excluding the light incident area 51. A laminated structure of the first dielectric multi-layer film 43A and the second dielectric multilayer film 50A formed on the light exiting area 52 functions as a second optical filter 43. Only the antireflection coating 50 is formed in the light incident area 51.

Figure 11:
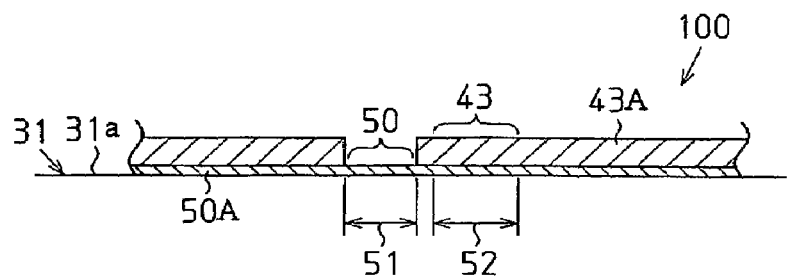
FIG. 11 is an enlarged cross-sectional diagram of an optical filter element included in a wavelength division multiplexing optical coupler according to a second embodiment of the present invention.
Figure 12A:
FIGS. 12A to 12D are schematic diagrams showing the procedures for manufacturing the optical filter element of FIG. 11.
Figure 12B:
Figure 12C:
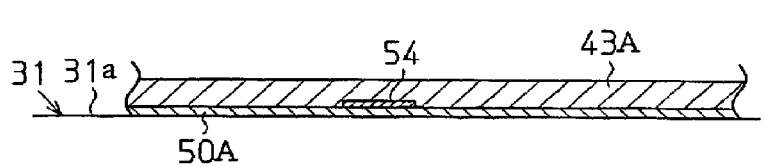
Figure 12D:
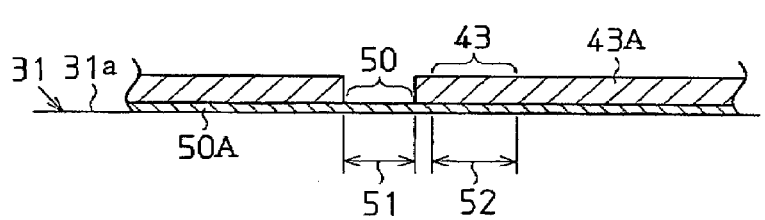
Figure 13:
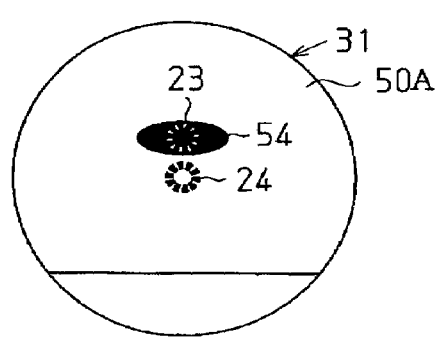
FIG. 13 is an explanatory diagram showing the masking process of FIG. 12B.

A manufacturing method for the optical filter element 100 of FIG. 11 will now be described with reference to FIGS. 12 and 13.

[Process 1: FIG. 12A]

The second dielectric multilayer film 50A is formed over the entire first end face 31a of the first lens 31.

[Process 2: FIG. 12B]

The light incident area 51 on the second dielectric multilayer film 50A is masked. The masking includes formation of a masking layer 54 by applying a masking resin to the light incident area 51.

[Process 3: FIG. 12C]

The first dielectric multilayer film 43A is formed on the second dielectric multilayer film 50A. A portion of the first dielectric multilayer film 43A is formed on the masking layer 54.

[Process 4: FIG. 12D]

The masking layer 54 and the portion of the first dielectric multilayer film 43A formed on the masking layer 54 are selectively removed at the same time.

With the processes 1 to 4, the antireflection coating 50 is formed locally in the light incident area 51. As a result, the second optical filter 43 having a laminated structure of the first dielectric multilayer film 43A and the second dielectric multilayer film 50A is formed in the light exiting area 52.

Example 2 according to the second embodiment will now be described.

The coupler 1 of example 2 has the same target specifications as the coupler 1 of example 1.

The second dielectric multilayer film 50A was formed by alternately laminating $SiO_2$ layers and $TiO_2$ layers of 11 layers in total on the first end face 31a. In Table 2, numerals 1 to 11 show the film structure of the second dielectric multilayer film 50A. Letter S indicates that the layer is an $SiO_2$ layer, and letter T indicates that the layer is a $TiO_2$ layer. The numerical values each show the optical film thickness of the layer (in λ/4 units). The second dielectric multilayer film 50A had the same film structure and the same theoretical properties as those of example 1.

The first dielectric multilayer film 43A was formed by alternately laminating $SiO_2$ layers and $TiO_2$ layers of 75 layers in total on the portion of the second dielectric multilayer film 50A excluding the light incident area 51. The first dielectric multilayer film 43A transmitted light beams having a wavelength of 1310 nm and reflected light beams having a wavelength of 1530 nm. In Table 2, numerals 12 to 86 show the film structure of the first dielectric multilayer film 43A.

Figure 14:
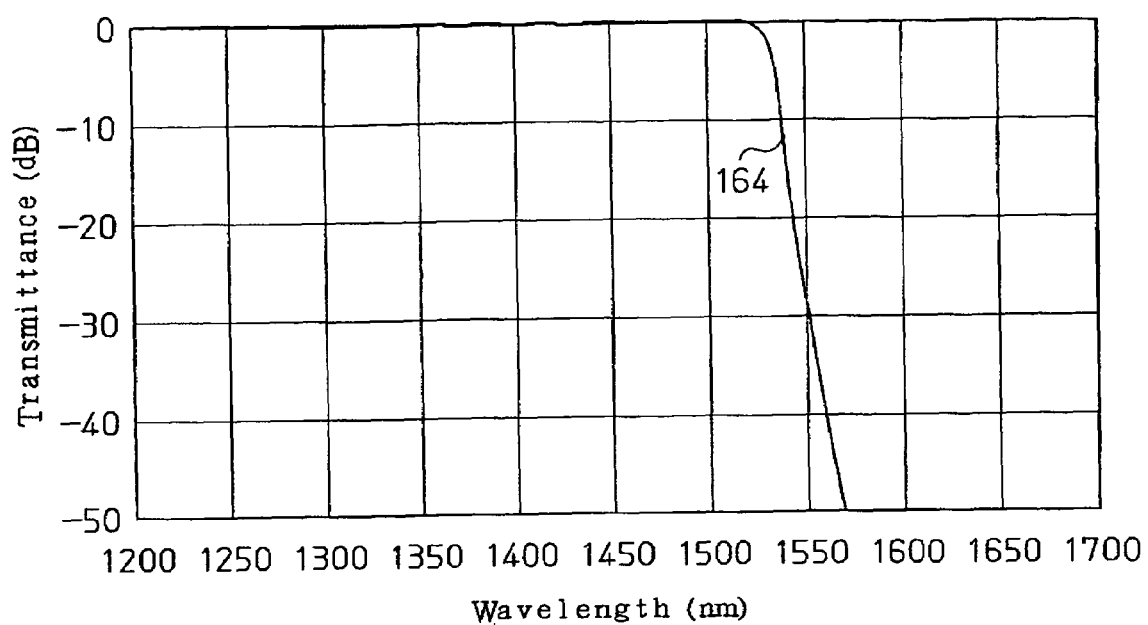
FIG. 14 is a graph showing theoretical properties of an edge filter functioning as a second optical filter included in a wavelength division multiplexing optical coupler of example 2.

As a result, the second optical filter 43 was formed by alternately laminating $SiO_2$ layers and $TiO_2$ layers of 86 layers in total. The design wavelength of the second optical filter 43 is 1650 nm. The layer with numeral 1 in Table 2 was the lowest layer near the first end face 31a. The layer with numeral 85 in Table 2 was the highest layer located far from the first end face 31a. Curve 164 in FIG. 14 shows theoretical properties of the second optical filter 43 of example 2.

TABLE 2

| 1 | 0.9515S | 2 | 0.1041T | 3 | 0.5818S | 4 | 0.8527T | 5 | 0.1368S |
|---|---------|---|---------|---|---------|---|---------|---|---------|
| 6 | 0.6585T | 7 | 1.0677S | 8 | 0.268T  | 9 | 0.3261S | 10 | 0.9698T |

TABLE 2-continued

| | | | | | | | | | |
|---|---|---|---|---|---|---|---|---|---|
| 11 | 0.8835S | 12 | 0.0493T | 13 | 0.828S | 14 | 1.7569T | 15 | 1.317S |
| 16 | 1.458T | 17 | 0.2927S | 18 | 1.6304T | 19 | 0.6253S | 20 | 1.5309T |
| 21 | 0.6033S | 22 | 1.5261T | 23 | 0.515S | 24 | 1.5008T | 25 | 0.5351S |
| 26 | 1.5105T | 27 | 0.6247S | 28 | 1.4499T | 29 | 0.5916S | 30 | 1.4927T |
| 31 | 0.5839S | 32 | 1.479T | 33 | 0.5173S | 34 | 1.5231T | 35 | 0.5437S |
| 36 | 1.4788T | 37 | 0.5555S | 38 | 1.5249T | 39 | 0.5201S | 40 | 1.4645T |
| 41 | 0.5937S | 42 | 1.5072T | 43 | 0.5408T | 44 | 1.4968T | 45 | 0.5464S |
| 46 | 1.5303T | 47 | 0.4216S | 48 | 1.5708T | 49 | 0.4689S | 50 | 1.526T |
| 51 | 0.4653S | 52 | 1.5618T | 53 | 0.5169S | 54 | 1.5155T | 55 | 0.4582S |
| 56 | 1.5121T | 57 | 0.6115S | 58 | 1.4893T | 59 | 0.5241S | 60 | 1.522T |
| 61 | 0.5252S | 62 | 1.4908T | 63 | 0.4978S | 64 | 1.5268T | 65 | 0.5987S |
| 66 | 1.4708T | 67 | 0.546S | 68 | 1.5269T | 69 | 0.4952S | 70 | 1.5131T |
| 71 | 0.5642S | 72 | 1.4882T | 73 | 0.5662S | 74 | 1.5354T | 75 | 0.5543S |
| 76 | 1.5256T | 77 | 0.5386S | 78 | 1.6681T | 79 | 0.2194S | 80 | 1.5645T |
| 81 | 0.5357S | 82 | 1.4444T | 83 | 1.2935S | 84 | 2.4594T | 85 | 0.4868S |
| 86 | 0.1503T | | | | | | | | |

The filter-incorporating lens 33 including the first optical filter 41, the second optical filter 43, and the antireflection coating 50 formed integrally was manufactured. The properties of the filter-incorporating lens 33 were assessed using the assessment optical system shown in FIG. 9.

Figure 15A:
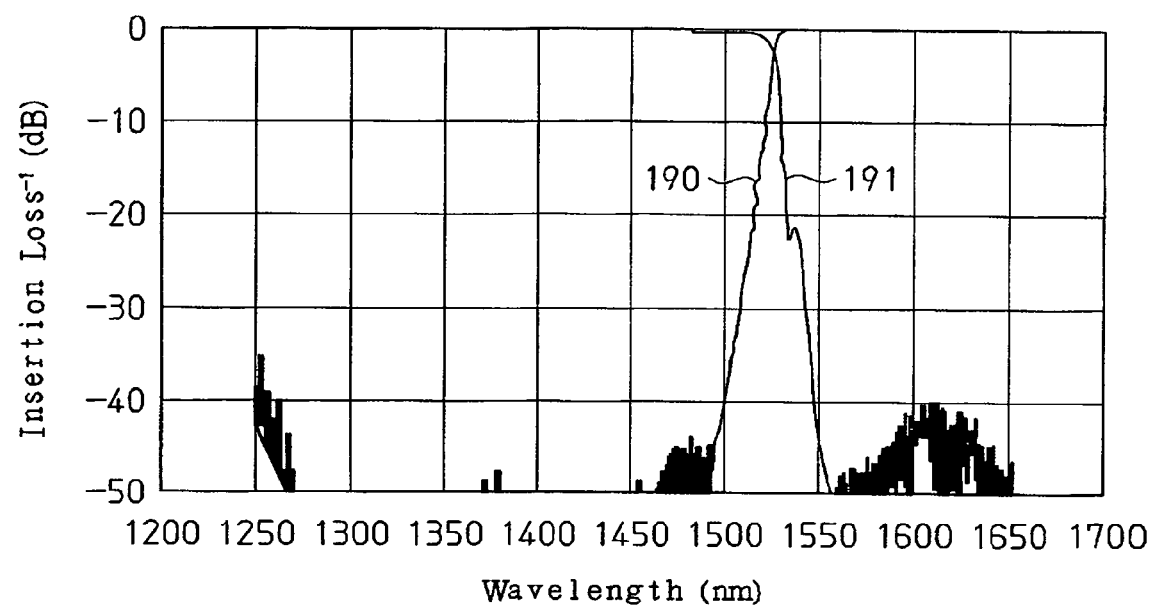
FIGS. 15A and 15B are graphs showing results of measurement of a filter-incorporating lens included in the wavelength division multiplexing optical coupler of example 2.
Figure 15B:
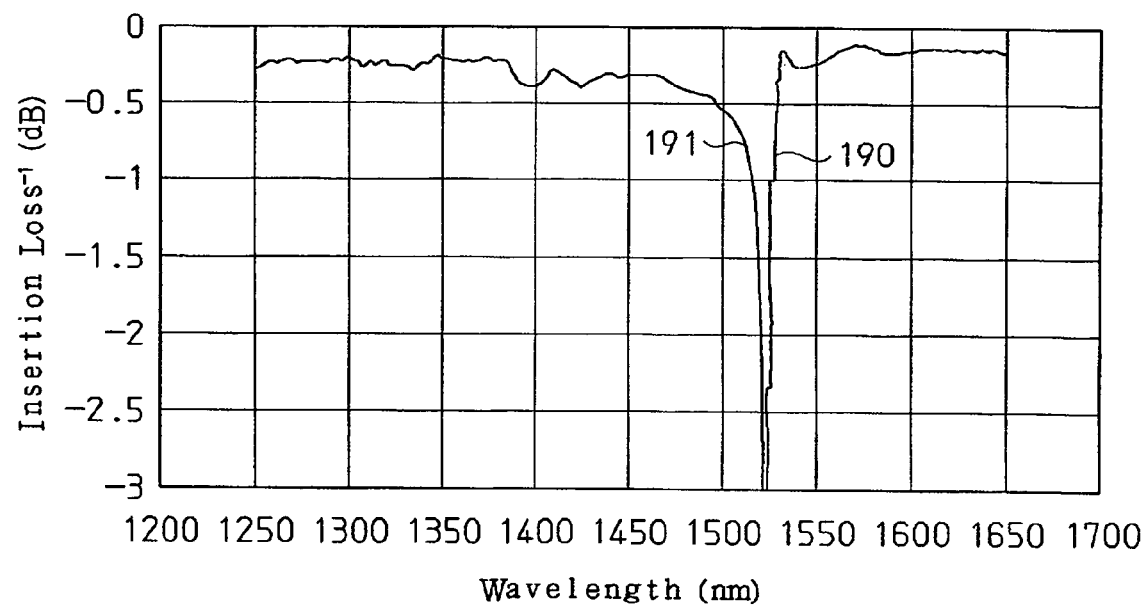

FIGS. 15A and 15B show the assessment results. FIG. 15B is an enlarged view of FIG. 15A. Curve 190 shows the insertion loss of the output light (light beams having the wavelength λ2) of the transmitted light output port 74. Curve 191 shows the insertion loss of the output light (light beams having the wavelength λ1) of the reflected light output port 75. The assessment results reveal that the target specifications described above were achieved at the ports 74 and 75.

The second embodiment has the same advantages as the first embodiment.

A third embodiment of the present invention will now be described. An optical filter element 100 and a wavelength division multiplexing optical coupler 1 according to the third embodiment differ from those of the first embodiment in the structure of its second optical filter 43. A light incident area 51 of a lens 31 is covered solely by an antireflection coating 50, and a light exiting area 52 is covered by a laminated structure of the antireflection coating 50 and the second optical filter 43 (refer to FIG. 3B).

In the third embodiment, the second optical filter 43 is formed by alternately laminating high refractive index dielectric layers and low refractive index dielectric layers. The sum of the optical film thickness of the high refractive index dielectric layers and the optical film thickness of the low refractive index dielectric layers is λ/2. The optical film thickness of each high refractive index dielectric layer is greater than λ/4 and less than λ/2.

The structure of the optical filter element 100 of the third embodiment, particularly the structure of each layer of the second optical filter 43, will now be described through examples 3 and 4.

The wavelength division multiplexing optical couplers 1 of examples 3 and 4 have the properties described below as their target specifications. The properties comply with B-PON standards.

Transmission isolation of 40 dB or greater (wavelength range: 1260 to 1360 nm, 1480 to 1500 nm)

Reflection isolation of 40 dB or greater (wavelength range: 1550 to 1565 nm)

Transmission insertion loss of 0.7 dB or less (wavelength range: 1260 to 1360 nm, 1480 to 1500 nm)

Reflection insertion loss of 0.7 dB or less (wavelength range: 1550 to 1565 nm)

Polarization dependent loss of 0.2 dB or less (in all the ranges above)

Figure 18:
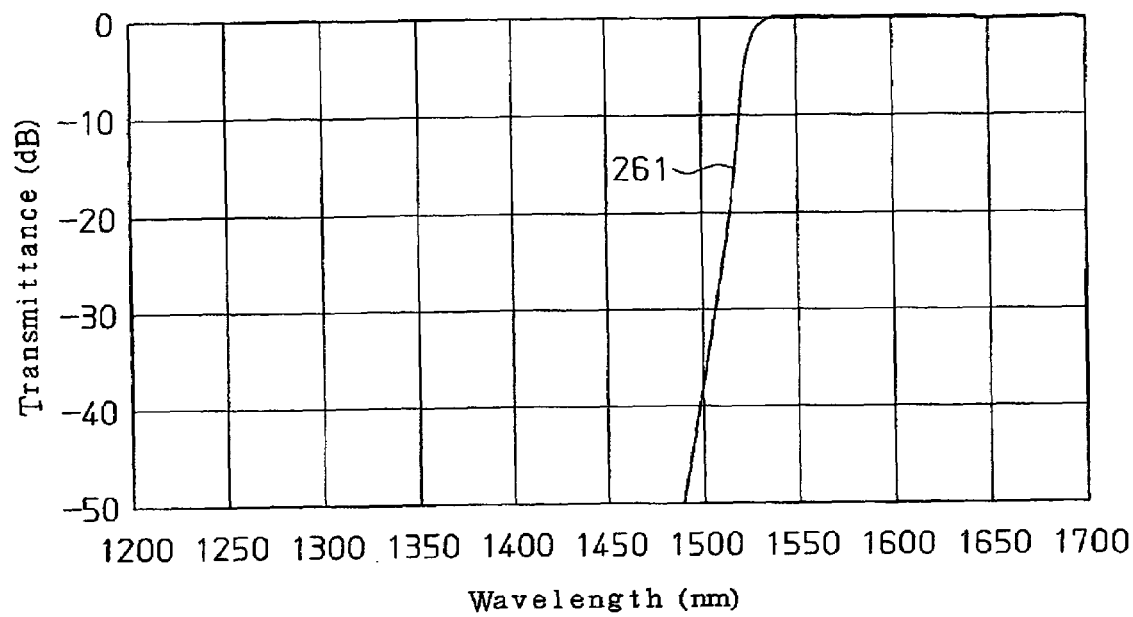
FIG. 18 is a graph showing theoretical properties of first optical filters of examples 3 and 4.

In examples 3 and 4, the first lens 31 was a gradient index rod lens having a diameter of 1.8 mm. The first optical filter 41 was an edge filter that reflects light beams having wavelengths of 1310 nm and 1490 nm and transmits light beams having a wavelength of 1530 nm. The first optical filter 41 was a dielectric multilayer film in which $SiO_2$ layers and $TiO_2$ layers were alternately laminated to form 74 layers in total. Curve 261 in FIG. 18 shows theoretical properties of the first optical filter 41.

Figure 21:
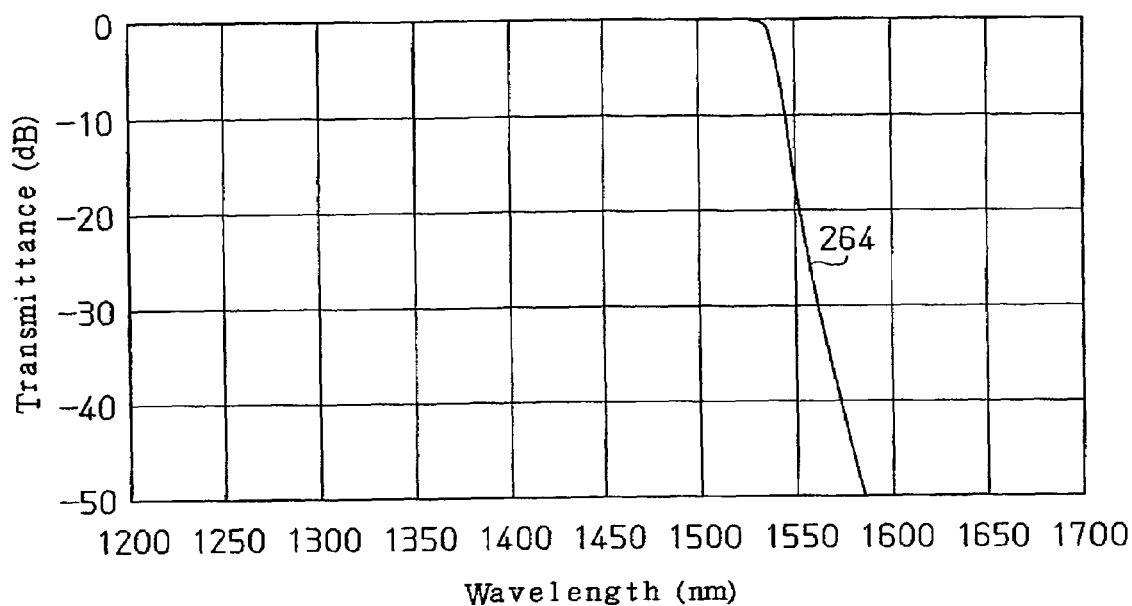
FIG. 21 is a graph showing theoretical properties of a second optical filter of example 3.

In example 3, the second optical filter 43 was an edge filter (the first dielectric multilayer film 43A) that transmitted light beams having wavelengths of 1310 nm and 1490 nm and reflected light beams having a wavelength of 1530 nm. The second optical filter 43 was formed on a portion of the tilted first surface 31a of the first lens 31 excluding the light incident area 51. The first dielectric multilayer film 43A is a dielectric multilayer film in which high refractive index dielectric layers and low refractive index dielectric layers were alternately laminated. The high refractive index dielectric layers were composed mainly of $TiO_2$, which is a high refractive material. The low refractive index dielectric layers were composed mainly of $SiO_2$, which is a low refractive material. Table 3 shows the film structure of the first dielectric multilayer film 43A. In Table 3, letter S indicates that the layer is an $SiO_2$ layer, and letter T indicates that the layer is a $TiO_2$ layer. The numerical values each show the optical film thickness of the layer (in λ/4 units). The design wavelength of the first dielectric multilayer film 43A is 1760 nm. Curve 264 in FIG. 21 shows theoretical properties of the first dielectric multilayer film 43A.

TABLE 3

| | | | | | | | | | |
|---|---|---|---|---|---|---|---|---|---|
| 1 | 0.8968S | 2 | 0.0988T | 3 | 0.5438S | 4 | 0.7993T | 5 | 0.1307S |
| 6 | 0.6164T | 7 | 1.0012S | 8 | 0.252T | 9 | 0.3075S | 10 | 0.9085T |
| 11 | 0.8301S | 12 | 0.0573T | 13 | 0.4395S | 14 | 1.0971T | 15 | 1.0471S |
| 16 | 1.0993T | 17 | 1.0675S | 18 | 1.0031T | 19 | 0.9898S | 20 | 1.0717T |
| 21 | 0.9998S | 22 | 1.0084T | 23 | 0.9836S | 24 | 1.0358T | 25 | 1.0003S |
| 26 | 0.9986T | 27 | 0.9997S | 28 | 1.0024T | 29 | 1.0035S | 30 | 1.0014T |
| 31 | 0.9986S | 32 | 1.0053T | 33 | 0.9762S | 34 | 1.0251T | 35 | 0.991S |
| 36 | 0.9935T | 37 | 0.998S | 38 | 1.0009T | 39 | 1.0004S | 40 | 0.9977T |
| 41 | 0.9957S | 42 | 0.9971T | 43 | 0.9999S | 44 | 1T | 45 | 0.9983S |
| 46 | 0.997T | 47 | 0.9977S | 48 | 0.9998T | 49 | 1.0007S | 50 | 1.0002T |
| 51 | 0.9987S | 52 | 0.9989T | 53 | 1.0003S | 54 | 1.0049T | 55 | 1.0056S |
| 56 | 0.9997T | 57 | 0.9961S | 58 | 1.0254T | 59 | 0.9885S | 60 | 1.0406T |
| 61 | 0.98S | 62 | 1.0292T | 63 | 1.0463S | 64 | 1.0192T | 65 | 1.0338S |
| 66 | 1.0842T | 67 | 1.1236S | 68 | 1.0482T | 69 | 0.6098S | | |

In example 4, the optical filter 43 includes the first dielectric multilayer film 43A having the film structure shown as 1 to 65 in Table 4 and the second dielectric multilayer film 50A having the film structure shown as 66 to 76 in Table 4. The design wavelength of the optical filter 43 of example 4 was 1629 nm. The first dielectric multilayer film 43A (65 layers) has the same theoretical optical properties as those of example 3 shown in FIG. 21.

TABLE 4

| | | | | | | | | | |
|---|---|---|---|---|---|---|---|---|---|
| 1 | 1.01209S | 2 | 0.06526T | 3 | 0.22942S | 4 | 1.38957T | 5 | 1.0924S |
| 6 | 1.54487T | 7 | 0.32305S | 8 | 1.56201T | 9 | 0.54812S | 10 | 1.57525T |
| 11 | 0.71817S | 12 | 1.46827T | 13 | 0.54275S | 14 | 1.61059T | 15 | 0.41577S |
| 16 | 1.48995T | 17 | 0.62267S | 18 | 1.55539T | 19 | 0.55106S | 20 | 1.4736T |
| 21 | 0.58423S | 22 | 1.52T | 23 | 0.5724S | 24 | 1.48835T | 25 | 0.62061S |
| 26 | 1.50096T | 27 | 0.4905S | 28 | 1.52554T | 29 | 0.61806S | 30 | 1.48838T |
| 31 | 0.50076S | 32 | 1.5108T | 33 | 0.68406S | 34 | 1.50677T | 35 | 0.4141S |
| 36 | 1.54297T | 37 | 0.53406S | 38 | 1.54349T | 39 | 0.52933S | 40 | 1.49173T |
| 41 | 0.6158S | 42 | 1.5396T | 43 | 0.46095S | 44 | 1.43727T | 45 | 0.73055S |
| 46 | 1.4425T | 47 | 0.69955S | 48 | 1.44211T | 49 | 0.51784S | 50 | 1.50845T |
| 51 | 0.61555S | 52 | 1.48914T | 53 | 0.59096S | 54 | 1.49446T | 55 | 0.53112S |
| 56 | 1.51704T | 57 | 0.61272S | 58 | 1.47273T | 59 | 0.61692S | 60 | 1.56265T |
| 61 | 0.47628S | 62 | 1.53255T | 63 | 0.43865S | 64 | 1.57267T | 65 | 0.6036S |
| 66 | 1.50412T | 67 | 0.77501S | 68 | 1.7733T | 69 | 0.17499S | 70 | 1.3921T |
| 71 | 0.24545S | 72 | 1.55871T | 73 | 1.33253S | 74 | 2.82614T | 75 | 0.67015S |
| 76 | 0.0227T | | | | | | | | |

Figure 16:
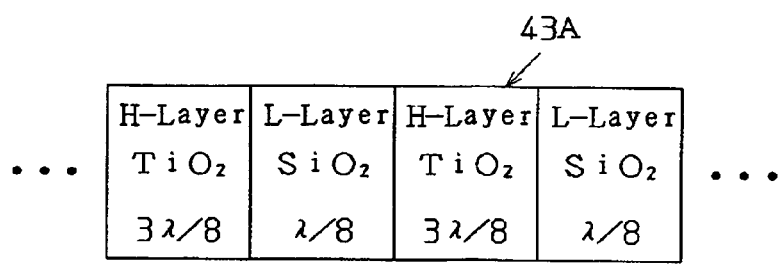
FIG. 16 is an explanatory diagram showing the basic structure of a dielectric multilayer film included in a second optical filter according to a third embodiment of the present invention.

For the first dielectric multilayer films 43A of examples 3 and 4, the sum of the optical film thickness of the high refractive index dielectric layers (H layers) and the optical film thickness of the low refractive index dielectric layers (L layers) was $\lambda/2$. The optical film thickness of each high refractive index dielectric layer was greater than $\lambda/4$ and less than $\lambda/2$. As shown in FIG. 16, the first dielectric multilayer film 43A was basically formed by high refractive index dielectric layers, each having an optical film thickness of $3\lambda/8$, and low refractive index dielectric layers, each having an optical film thickness of $\lambda/8$.

Figure 17:
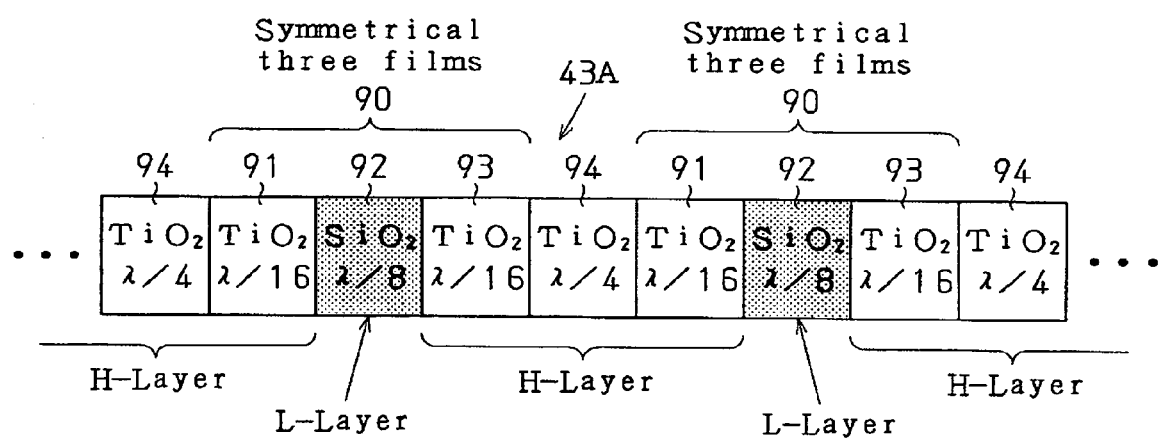
FIG. 17 is an explanatory diagram showing H layers and L layers shown in FIG. 16.

This basic structure of the first dielectric multilayer film 43A was determined by optimization based on the equivalent film theory (refer to H. A. Macleod, "Thin Film Optical Filters", §66.2.2, p. 212). As shown in FIG. 17, a TiO$_2$ layer 91 having an optical film thickness of $\lambda/16$, an SiO$_2$ layer 92 having an optical film thickness of $\lambda/8$, and a TiO$_2$ layer 93 having an optical film thickness of $\lambda/16$ form a three-layer symmetrical film 90. The equivalent refractive index of each three-layer symmetrical film 90 is about 1.68. A TiO$_2$ layer 94 having an optical film thickness of $\lambda/4$ is arranged between two three-layer symmetrical films 90. The optical film thickness of each high refractive index dielectric layer (H layer) is substantially $3\lambda/8$ ($\lambda/16+\lambda/4+\lambda/16$). The optical film thickness of each low refractive index dielectric layer (L layer) is $\lambda/8$.

Figure 19:
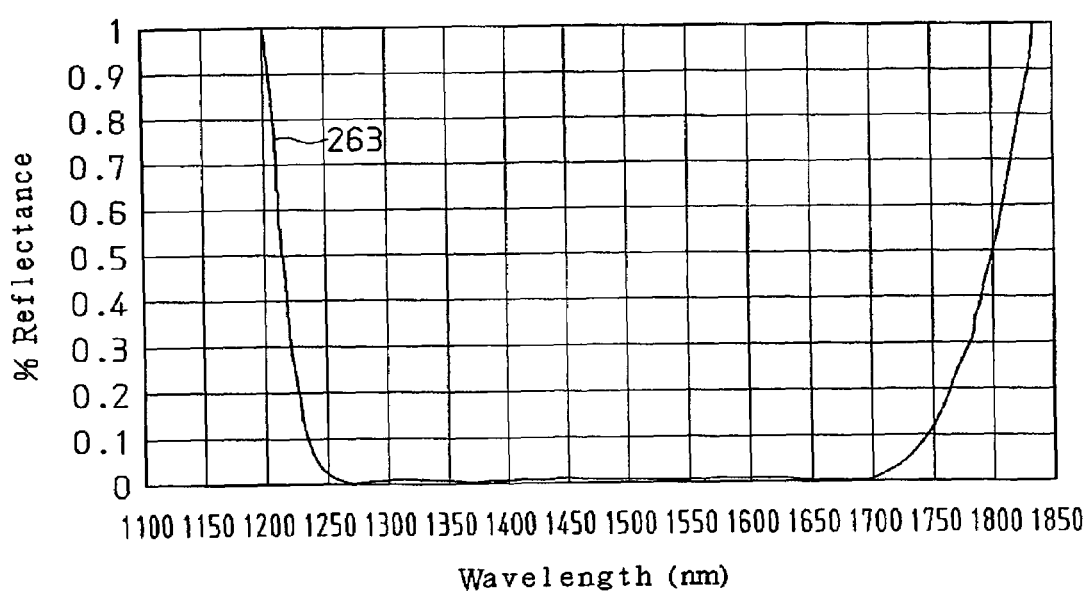
FIG. 19 is a graph showing theoretical properties of a second dielectric multilayer film of example 4.
Figure 20:
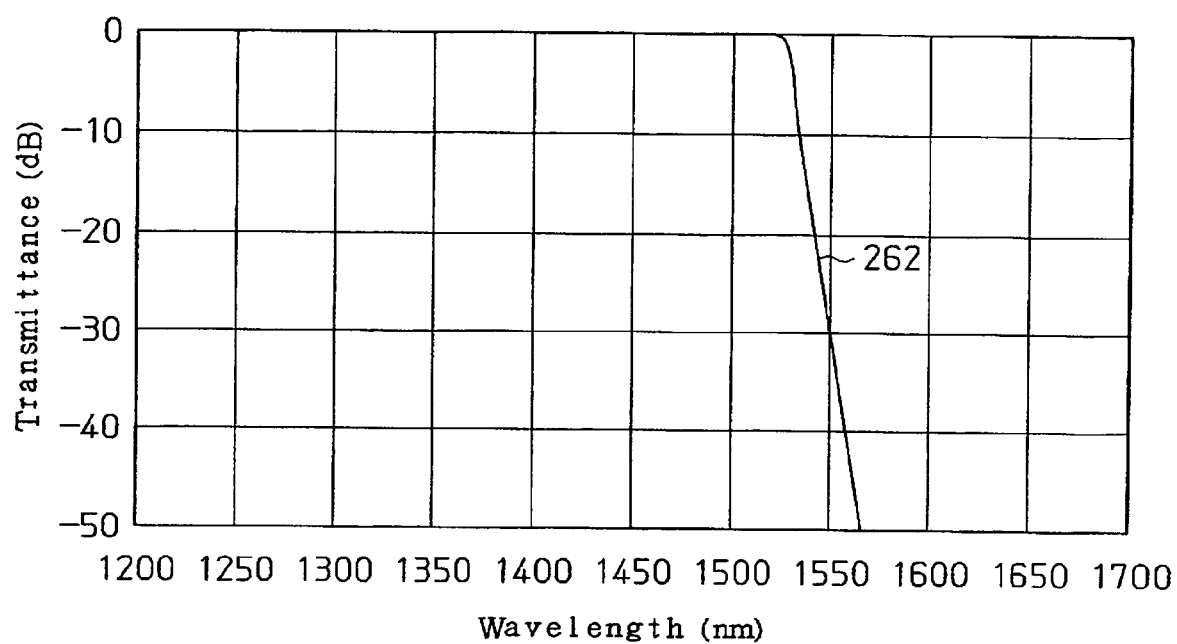
FIG. 20 is a graph showing theoretical properties of a second optical filter of example 4.

In example 4, the second dielectric multilayer film 50A was formed on the first dielectric multilayer film 43A throughout the entire first end face 31a. The second dielectric multilayer film 50A was formed by alternately laminating SiO$_2$ layers and TiO$_2$ layers of 11 layers in total. Curve 263 in FIG. 19 shows theoretical properties of the second dielectric multilayer film 50A. The first dielectric multilayer film 43A and the second dielectric multilayer film 50A were formed from the same material. Curve 262 in FIG. 20 shows theoretical properties of the second optical filter 43 of example 4.

Figure 22:
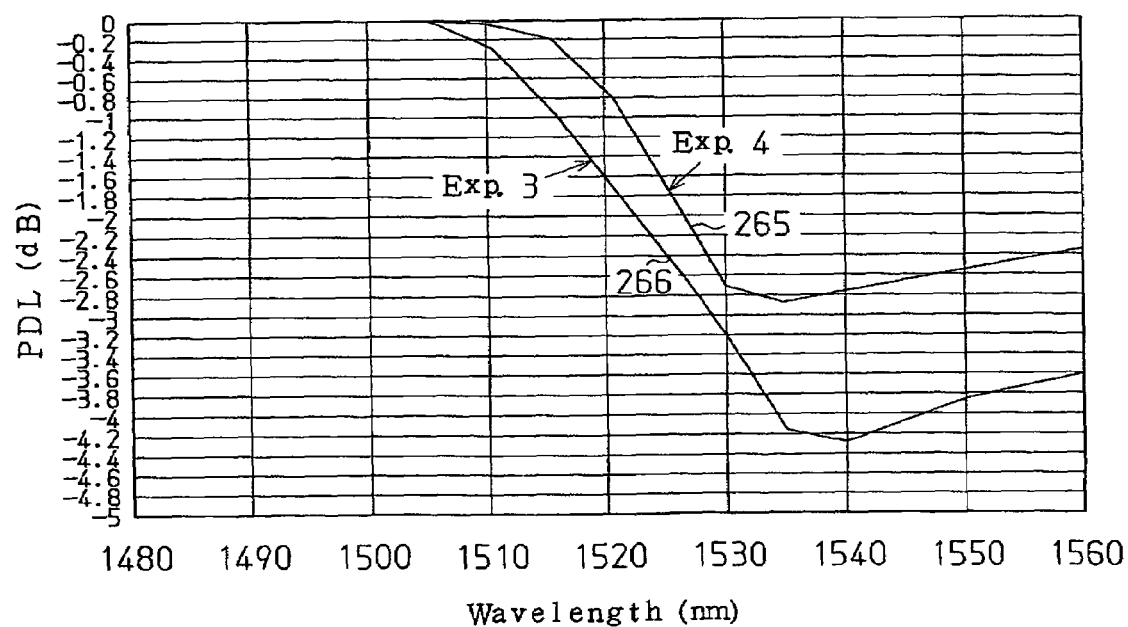
FIG. 22 is a graph showing the polarization dependent loss of examples 3 and 4.

FIG. 22 shows simulation values of the polarization dependent loss (PDL) of the optical filters 43 of examples 3 and 4. Curve 226 shows the PDL of example 3. Curve 265 shows the PDL of example 4. As FIG. 22 shows, curve 265 for the optical filter 43 of example 4 is inclined more sharply around its edge wavelength than curve 266 for the optical filter 43 of example 3. This reveals that the optical filter 32 of example 4 reduced the polarization dependent loss more around its edge wavelength than the optical filter 32 of example 3.

Figure 23:
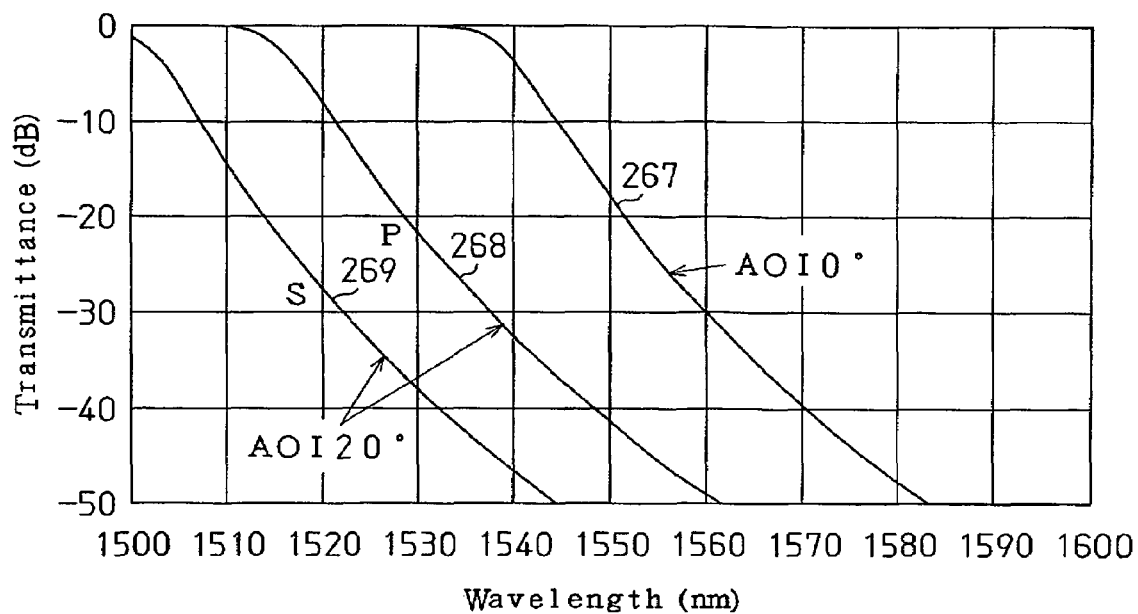
FIG. 23 is a graph showing simulation values of the incident angle dependency and the polarization dependency of example 3.

FIG. 23 shows simulation values of the incident angle dependency and the polarization split (polarization dependency) of transmission of the optical filter 43 of example 3. In FIG. 23, curve 267 shows the transmission at an angle of incident (AOI) of 0 degree, curves 268 and 269 respectively show the transmission of P-polarization elements and the transmission of S-polarization elements at an angle of incident of 20 degrees.

Figure 24:
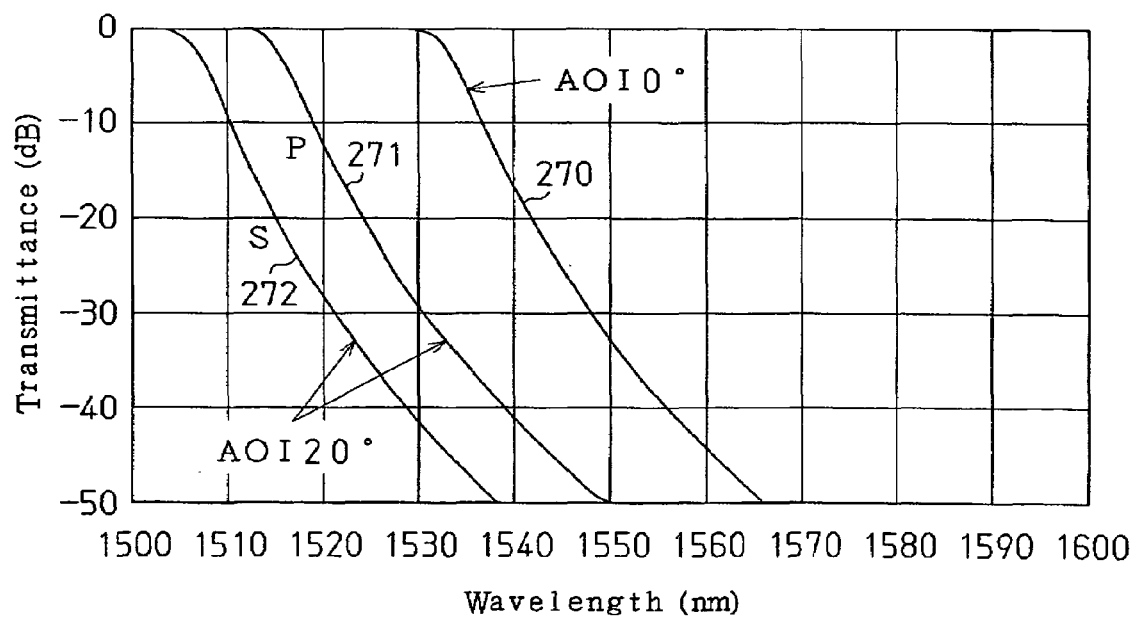
FIG. 24 is a graph showing simulation values of the incident angle dependency and the polarization dependency of example 4.

FIG. 24 shows simulation values of the incident angle dependency and the polarization dependency of transmission of the optical filter 43 of example 4. In FIG. 24, curve 270 shows the transmission at an angle of incident of 0 degree, and curves 271 and 272 respectively show the transmission of P-polarization elements and the transmission of S-polarization elements at an angle of incident of 20 degrees.

Comparing FIGS. 23 and 24, the optical filter 43 of example 4 has a smaller polarization split and a smaller incident angle dependency than the optical filter 43 of example 3.

Figure 25A:
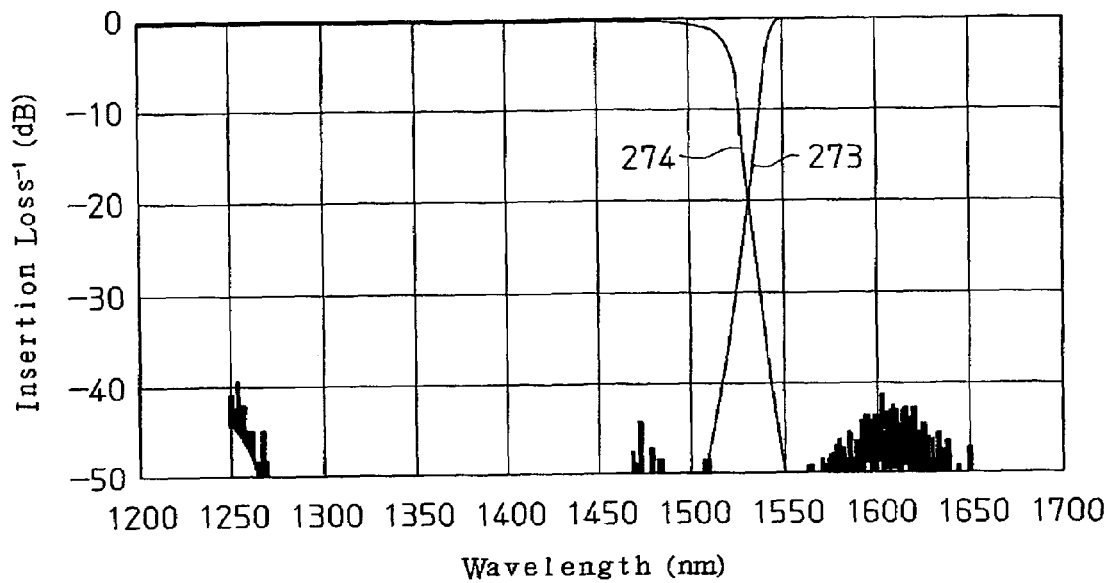
FIGS. 25A and 25B are graphs showing measurement results of the insertion loss of example 4.
Figure 25B:
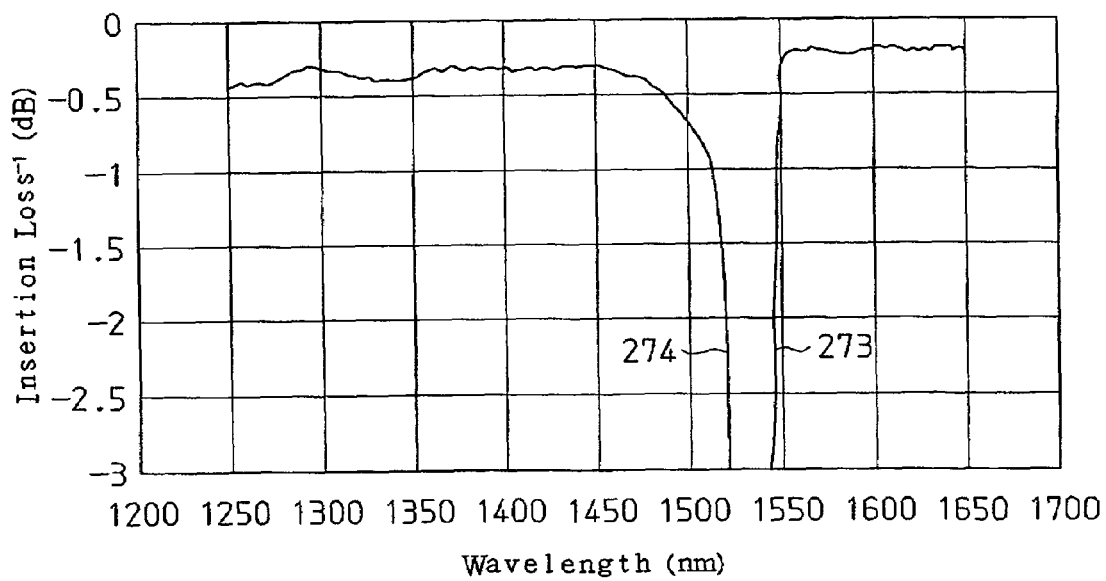

FIGS. 25A and 25B show the insertion loss of the filter-incorporating lens 33 of example 4 in which the first optical filter 41 is formed on the second end face 31b of the first lens 31 and the second optical filter 43 is formed on the first end face 31a of the first lens 31. In FIGS. 25A and 25B, the vertical axis shows the inverse of the insertion loss. The inverse of the insertion loss is the ratio of the intensity of input light beams provided to the light input port and the intensity of output light beams observed at the reflection port and the transmission port. The light intensity ratio is expressed in dB units. FIG. 25B is an enlarged view of FIG. 25A.

Curve 273 in FIGS. 25A and 25B shows the intensity of light output from the transmitted light output port. The ratio of the intensity of light having a wavelength of 1550 nm corresponding to $\lambda 2$ and the intensity of light having a wavelength of 1310 nm or 1490 nm corresponding to $\lambda 1$ is 40 dB or greater. In this case, the target specification value of the transmission isolation was achieved. As shown in FIG. 25B, the insertion loss at a wavelength of 1550 nm was about 0.2 to 0.3 dB. In this case, the target specification value of the transmission insertion loss was also achieved.

Curve 274 shows the intensity of light output from the reflected light output port. The ratio of the intensity of light having a wavelength of 1310 nm or 1490 nm corresponding to $\lambda 1$ and the intensity of light having a wavelength of 1550 nm corresponding to $\lambda 2$ is 40 dB or greater. In this case, the target specification value of the reflection isolation was achieved. As shown in FIG. 25B, the insertion loss at a wavelength of 1310 nm or 1490 nm was about 0.3 to 0.4 dB.

In this case, the target specification value of the transmission insertion loss was also achieved.

Figure 26:
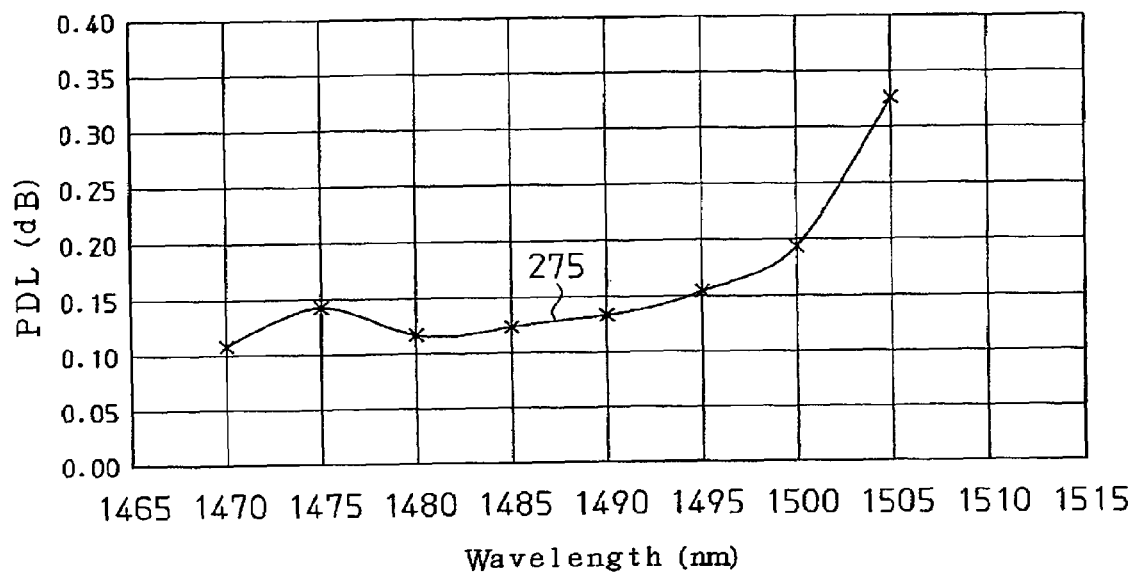
FIG. 26 is a graph showing the polarization dependent loss of example 4.

FIG. 26 shows the measurement results of the polarization dependent loss of the second optical filter 43 of example 4. Curve 275 shows that the target specification value of the polarization dependent loss was achieved.

A lens having a tilted surface effectively reduces a return loss of incident light. However, an optical filter arranged on the tilted surface of the lens typically has a large polarization dependency. A gradient index rod lens converts light beams that are incident on its light incident surface (entering surface) into wide collimated light beams, and then emits the collimated light beams from its light exiting surface. Light beams having a predetermined wavelength included in the collimated light beams are reflected on the light exiting surface. The light beams converge from the light incident surface toward an optical fiber arranged on its output port. As a result, the converged light beams are output. When the optical filter is formed on the tilted surface, inclined incident light elements are increased. This causes the optical filter to have a large polarization dependency around its edge wavelength. In this case, a shift in the edge wavelength causes the optical filter to have poor wavelength properties around the edge wavelength. This hinders the reduction of its polarization dependency.

To solve the above problem, the first dielectric multilayer films 43A of examples 3 and 4 were formed in a manner that the sum of the optical film thickness of the high refractive index dielectric layers and the optical film thickness of the low refractive index dielectric layers was maintained as $\lambda/2$ and the optical film thickness of each high refractive index dielectric layer was greater than $\lambda/4$ and less than $\lambda/2$. This structure enables both the incident angle dependency of the second optical filter 43 and the corresponding polarization dependent loss to be reduced. This enables the optical filter to reduce its polarization dependency even around the edge wavelength of its transmission wavelength range.

The present invention may be embodied in the following forms.

In the third embodiment, when the second end face 31b of the lens 31 is a tilted surface, the dielectric multilayer film that is the same as the first dielectric multilayer film 43A may be formed on each of the first end face 31a and the second end face 31b of the lens 31. In this case, the same advantages as the advantages of the third embodiment are obtained.

In example 4, the optical film thickness of the first dielectric multilayer film 43A was in $\lambda/8$ units. However, the optical film thickness of the first dielectric multilayer film 43A may be in any units other than $\lambda/8$ units. It is only required that the sum of the optical film thickness of the high refractive index dielectric layers and the optical film thickness of the low refractive index dielectric layers be $\lambda/2$ and the optical film thickness of each high refractive index dielectric layer be greater than $\lambda/4$ and less than $\lambda/2$. This is a requirement that is to be satisfied in the third embodiment. The upper limit of the optical film thickness is preferably about $2\lambda/5$.

Figure 27:
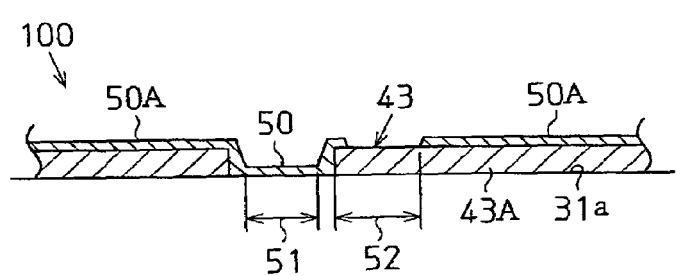
FIG. 27 is an enlarged cross-sectional view of an optical filter element according to a fourth embodiment of the present invention.

In a fourth embodiment of the present invention, an antireflection film 50 is formed locally in a light incident area 51 on a first end face 31a of a first lens 31 but is not formed in a light exiting area 52 as shown in FIG. 27. The remaining structure of the fourth embodiment is the same as the structure of the coupler 1 of the first embodiment. An optical filter element 100 according to the fourth embodiment is manufactured with the method described below.

Figure 28A:
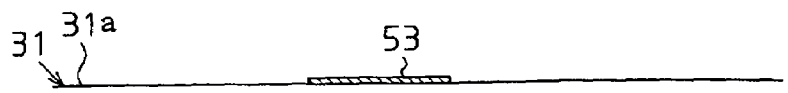
FIGS. 28A to 28F are schematic diagrams showing the procedures for manufacturing the optical filter element of FIG. 27.

[Process 1: FIG. 28A]

The light incident area 51 on the first end face 31a of the first lens 31 is locally masked. The masking includes formation of a masking layer 53 by applying a masking resin to the light incident area 51.

Figure 28B:
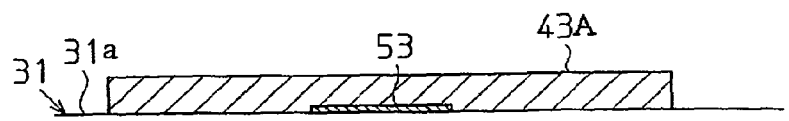

[Process 2: FIG. 28B]

The first dielectric multilayer film 43A is formed on the first end face 31a. A portion of the first dielectric multilayer film 43A is formed on the masking layer 53.

Figure 28C:

[Process 3: FIG. 28C]

The masking layer 53 and the portion of the first dielectric multilayer film 43A formed on the masking layer 53 are selectively removed at the same time.

Figure 28D:

[Process 4: FIG. 28D]

A portion of the first dielectric multilayer film 43A corresponding to the light exiting area 52 is locally masked. The masking includes formation of a masking layer 55 by applying a masking resin to the light exiting area 52.

Figure 28E:

[Process 5: FIG. 28E]

The second dielectric multilayer film 50A is formed on the first dielectric multilayer film 43A throughout the entire first end face 31a.

Figure 28F:
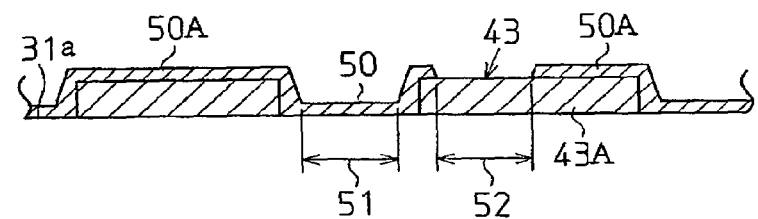

[Process 6: FIG. 28F]

The masking layer 55 and a portion of the first dielectric multilayer film 43A formed on the masking layer 55 are selectively removed at the same time.

With the processes 1 to 5, the antireflection coating 50 is formed locally in the light incident area 51. As a result, the second optical filter 43 including the first dielectric multilayer film 43A is formed in the light exiting area 52.

The fourth embodiment will now be described in detail through example 5.

The coupler 1 of example 5 has a tubular protective case (not shown) having a diameter of 5.5 mm and a length of about 40 mm. The coupler 1 has the properties described below as its target specifications. The properties comply with B-PON standards.

Transmission isolation of 40 dB or greater (wavelength range: 1260 to 1360 nm, 1480 to 1500 nm)

Reflection isolation of 40 dB or greater (wavelength range: 1550 to 1565 nm)

Transmission insertion loss of 0.7 dB or less (wavelength range: 1260 to 1360, 1480 to 1500 nm)

Reflection insertion loss of 0.7 dB or less (wavelength range: 1550 to 1565 nm)

Figure 29:
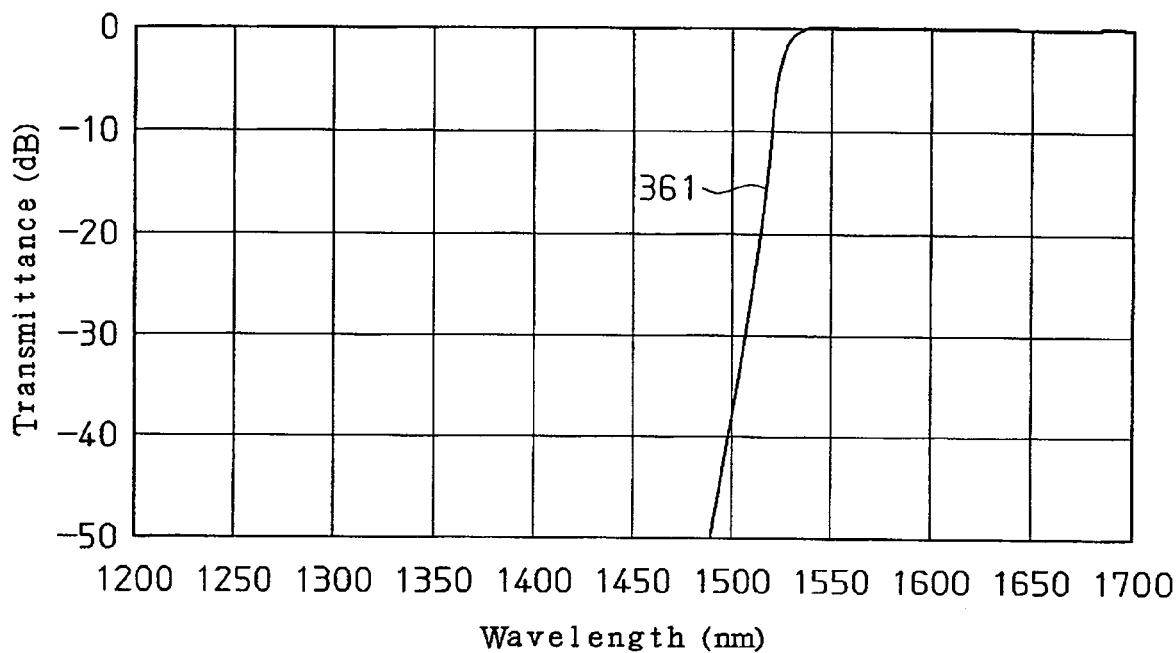
FIG. 29 is a graph showing theoretical properties of a first optical filter of example 5.

In example 5, the first lens 31 was a gradient index rod lens having a diameter of 1.8 mm. The first optical filter 41 was an edge filter that reflects light beams having wavelengths of 1310 nm and 1490 nm, and transmitted light beams having a wavelength of 1530 nm. The first optical filter 41 is a dielectric multilayer film in which $SiO_2$ layers and $TiO_2$ layers are alternately laminated to form 74 layers in total. The design wavelength of the first optical filter 41 is 1308.5 nm. Table 5 shows the film structure of the first optical filter 41. In Table 5, letter indicates that the layer is an $SiO_2$ layer, and letter T indicates that the layer is a $TiO_2$ layer. The numerical values each show the optical film thickness of the layer (in $\lambda/4$ units). Curve 361 in FIG. 29 shows theoretical properties of the first optical filter 41.

TABLE 5

| 1 | 0.2098S | 2 | 0.5579T | 3 | 0.8699S | 4 | 0.8688T | 5 | 0.9209S |
|---|---|---|---|---|---|---|---|---|---|
| 6 | 0.9658T | 7 | 0.9706S | 8 | 0.9584T | 9 | 0.9563S | 10 | 0.9498T |
| 11 | 1.0078S | 12 | 1.0184T | 13 | 0.998S | 14 | 0.9393T | 15 | 1.0056S |
| 16 | 1.0024T | 17 | 0.9935S | 18 | 0.979T | 19 | 0.9982S | 20 | 0.9982T |
| 21 | 0.9982S | 22 | 0.9982T | 23 | 0.9981S | 24 | 0.998T | 25 | 0.9979S |

TABLE 5-continued

| 26 | 0.998T | 27 | 0.998S | 28 | 0.998T | 29 | 0.9982S | 30 | 0.9984T |
| 31 | 0.9986S | 32 | 0.9991T | 33 | 0.9992S | 34 | 0.9998T | 35 | 0.9999S |
| 36 | 1T | 37 | 1.0001S | 38 | 1.0001T | 39 | 0.9998S | 40 | 0.9996T |
| 41 | 0.9994S | 42 | 0.9991T | 43 | 0.9988S | 44 | 0.9986T | 45 | 0.9985S |
| 46 | 0.9982T | 47 | 0.9982S | 48 | 0.9982T | 49 | 0.9982S | 50 | 0.9985T |
| 51 | 0.9984S | 52 | 0.9984T | 53 | 0.9984S | 54 | 0.9984T | 55 | 0.9982S |
| 56 | 0.9981T | 57 | 0.9757S | 58 | 0.9905T | 59 | 1.0016S | 60 | 1.0077T |
| 61 | 0.988S | 62 | 0.9674T | 63 | 0.9744S | 64 | 0.999T | 65 | 1.0163S |
| 66 | 1.0071T | 67 | 0.9495S | 68 | 0.9101T | 69 | 0.9144S | 70 | 0.9633T |
| 71 | 1.0135S | 72 | 1.0242T | 73 | 0.9573S | 74 | 0.3533T | | |

Figure 30:
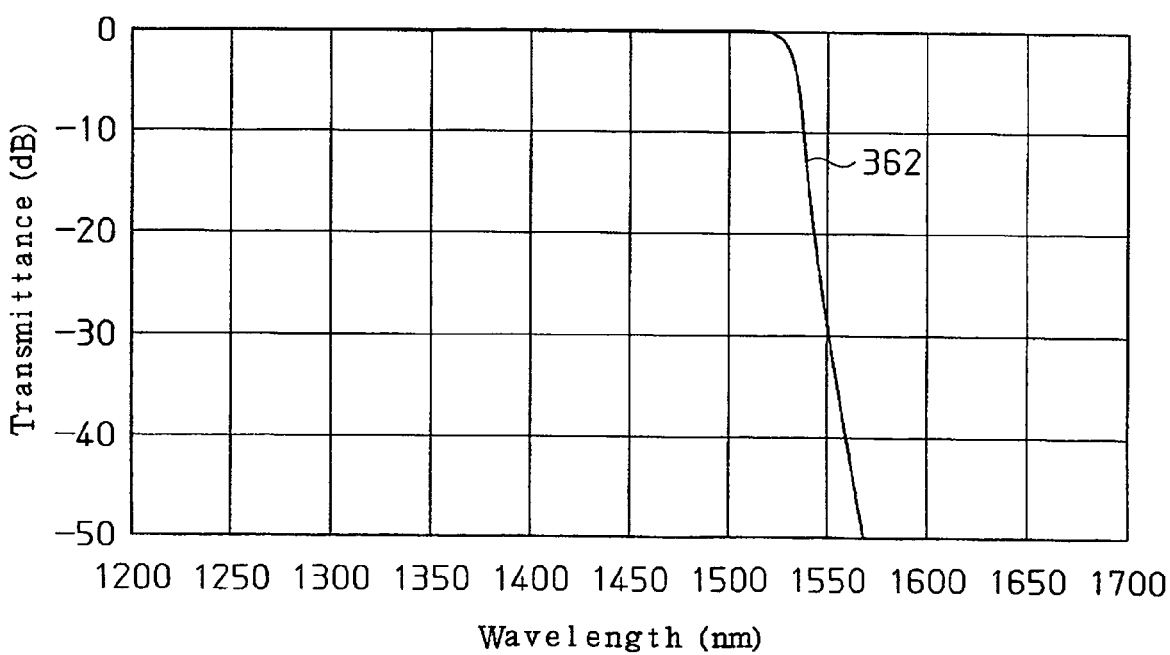
FIG. 30 is a graph showing theoretical properties of a second optical filter of example 5.

The first dielectric multilayer film 43A was formed only in the light exiting area 52 on the first end face 31a. The first dielectric multilayer film 43A was formed by alternately laminating $SiO_2$ layers and $TiO_2$ layers of 76 layers in total. The first dielectric multilayer film 43A was an edge filter that transmitted light beams having wavelengths of 1310 nm and 1490 nm and reflected light beams having a wavelength of 1530 nm. The design wavelength of the first dielectric multilayer film 43A was 1629 nm. Table 6 shows the film structure of the first dielectric multilayer film 43A. Curve 362 in FIG. 30 shows theoretical properties, of the first dielectric multilayer film 43A, that is, the second optical filter 43.

TABLE 6

| 1 | 1.01209S | 2 | 0.06526T | 3 | 0.22942S | 4 | 1.38957T | 5 | 1.0924S |
| 6 | 1.54487T | 7 | 0.32305S | 8 | 1.56201T | 9 | 0.54812S | 10 | 1.57525T |
| 11 | 0.71817S | 12 | 1.46827T | 13 | 0.54275S | 14 | 1.61059T | 15 | 0.41577S |
| 16 | 1.48995T | 17 | 0.62267S | 18 | 1.55539T | 19 | 0.55106S | 20 | 1.4736T |
| 21 | 0.58423S | 22 | 1.52T | 23 | 0.5724S | 24 | 1.48835T | 25 | 0.62061S |
| 26 | 1.50096T | 27 | 0.4905S | 28 | 1.52554T | 29 | 0.61806S | 30 | 1.48838T |
| 31 | 0.50076S | 32 | 1.5108T | 33 | 0.68406S | 34 | 1.50677T | 35 | 0.4141S |
| 36 | 1.54297T | 37 | 0.53406S | 38 | 1.54349T | 39 | 0.52933S | 40 | 1.49173T |
| 41 | 0.6158S | 42 | 1.5396T | 43 | 0.46095S | 44 | 1.43727T | 45 | 0.73055S |
| 46 | 1.4425T | 47 | 0.69955S | 48 | 1.44211T | 49 | 0.51784S | 50 | 1.50845T |
| 51 | 0.61555S | 52 | 1.48914T | 53 | 0.59096S | 54 | 1.49446T | 55 | 0.53112S |
| 56 | 1.51704T | 57 | 0.61272S | 58 | 1.47273T | 59 | 0.61692S | 60 | 1.56265T |
| 61 | 0.47628S | 62 | 1.53255T | 63 | 0.43865S | 64 | 1.57267T | 65 | 0.6036S |
| 66 | 1.50412T | 67 | 0.77501S | 68 | 1.7733T | 69 | 0.17499S | 70 | 1.3921T |
| 71 | 0.24545S | 72 | 1.55871T | 73 | 1.33253S | 74 | 2.82614T | 75 | 0.67015S |
| 76 | 0.227T | | | | | | | | |

Figure 31:
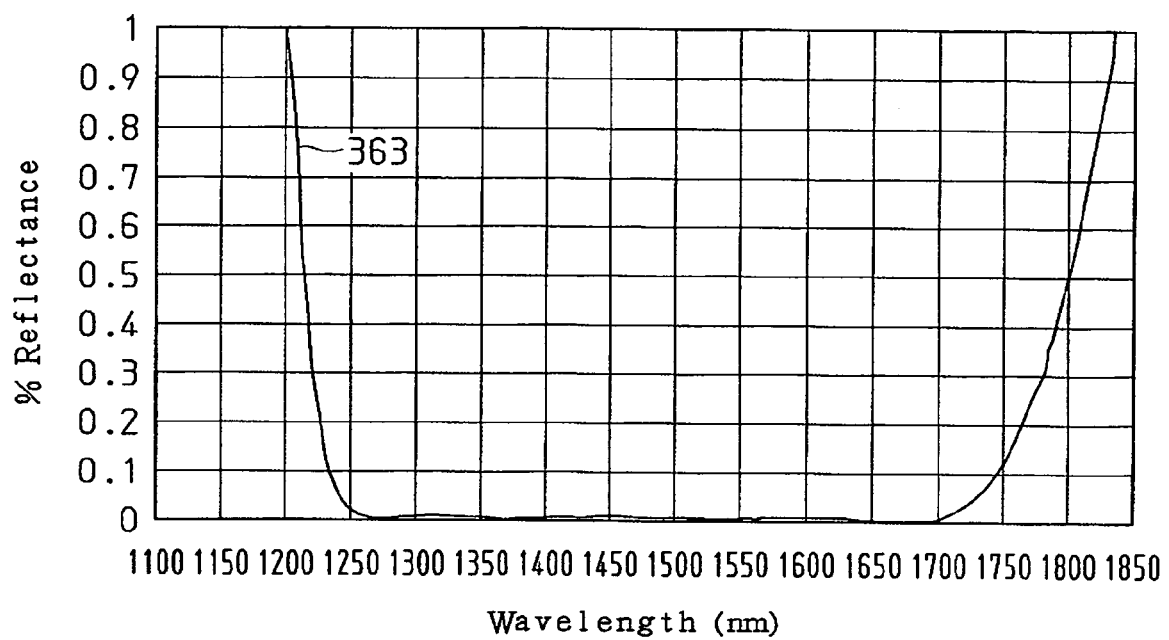
FIG. 31 is a graph showing theoretical properties of an antireflection coating of example 5.

The second dielectric multilayer film 50A having a design wavelength of 1650 nm was formed in the light incident area 51 on the first end face 31a. Table 7 shows the film structure of the second dielectric multilayer film 50A. Curve 363 in FIG. 31 shows theoretical properties of the second dielectric multilayer film 50A, that is, the antireflection film 50.

TABLE 7

| 1 | 0.9515S | 2 | 0.1041T | 3 | 0.5818S | 4 | 0.8527T | 5 | 0.1368S |
| 6 | 0.6585T | 7 | 1.0677S | 8 | 0.268T | 9 | 0.3261S | 10 | 0.9698T |
| 11 | 0.8835S | | | | | | | | |

A method for forming the optical filter element 100 of example 5 will now be described.

As shown in FIG. 28A, masking paint is applied to locally cover the light incident area 51 so as to form a masking layer 53. Then, the first dielectric multilayer film 43A is formed (refer to FIG. 28B). The masking layer 53 and a portion of the first dielectric multilayer film 43A formed on the masking layer 53 are removed using an organic solvent (refer to FIG. 28C). Masking paint is applied to a portion of the first dielectric multilayer film 43A corresponding to the light exiting area 52 so as to form a masking layer 55. The second dielectric multilayer film 50A is formed on the entire first end face 31a. The masking layer 55 is removed with an organic solvent. This also removes a portion of the second dielectric multilayer film 50A formed on the masking layer 55.

In this manner, the filter-incorporating lens 33 in which the first optical filter 41 is formed on the second end face 31b of the first lens 31 and the second optical filter 43 is formed on the first end face 31a of the first lens 31 is manufactured. The properties of the filter-incorporating lens 33 are assessed using the property assessment optical system (refer to FIG. 9).

Figure 32A:
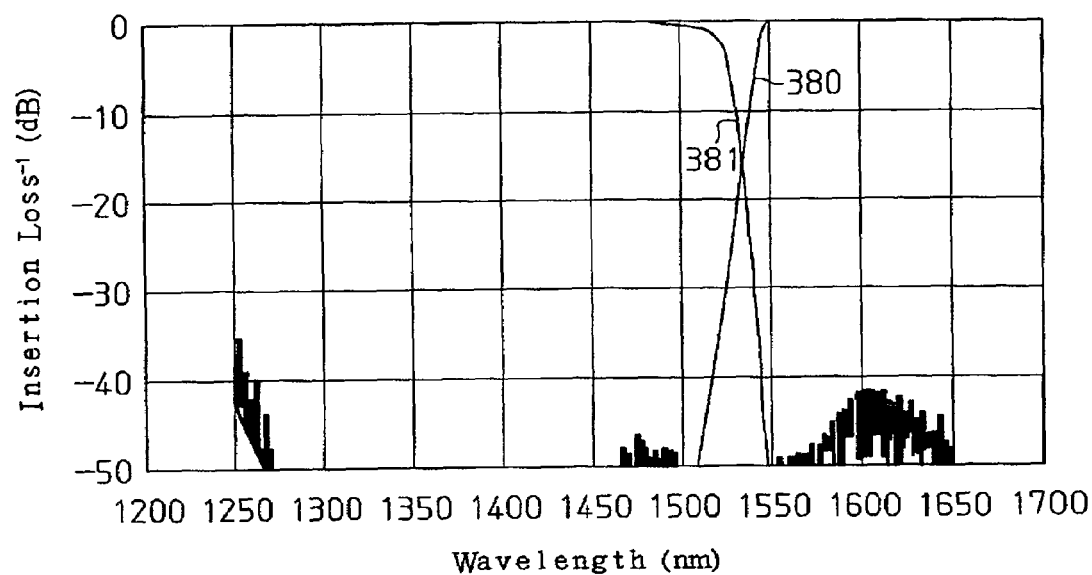
FIGS. 32A and 32B show graphs indicating measurement results of the insertion loss of a filter-incorporating lens 33 of example 5.
Figure 32B:
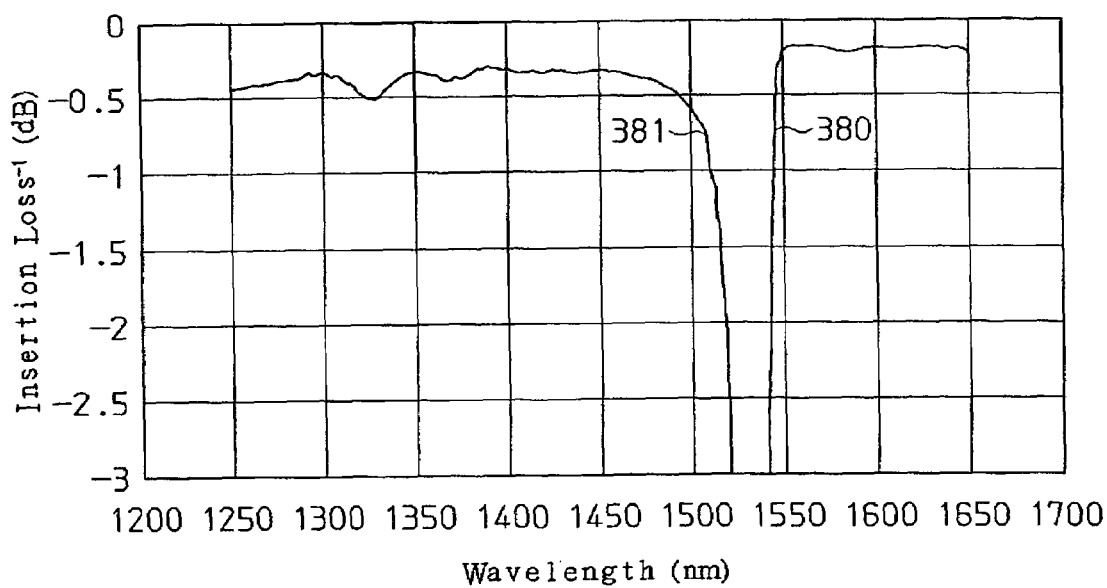

FIGS. 32A and 32B show the measurement results of the insertion loss of the filter-incorporating lens 33 of example 5. FIG. 32B is an enlarged view of FIG. 32A. Curve 380 shows the insertion loss of the output light (light beams having the wavelength $\lambda 2$) of the transmitted light output port 74. Curve 381 shows the insertion loss of the output light (light beams having the wavelength $\lambda 1$) of the reflected light output port 75. The assessment results reveal that the target specifications described above were achieved at the ports 74 and 75.

In addition to the advantages of the first embodiment, the fourth embodiment has the advantages described below.

The second optical filter 43 that transmits light beams having the first wavelength $\lambda 1$ and reflects light beams that do not have the first wavelength $\lambda 1$ is arranged on the first end face 31a of the first lens 31. The second optical filter 43 eliminates reflection residue elements that are included in the reflected light from the first optical filter 41. This reduces the amount of light that does not have the first wavelength $\lambda 1$ and that travels together with the output light output from the reflected light output port. As a result, the isolation of the reflected light output port is improved.

The antireflection film 50 is formed in the light incident area 51 for receiving input light beams into which optical signals of the wavelengths $\lambda 1$ and $\lambda 2$ are multiplexed. The antireflection film 50 not only prevents the input light beams from returning to the input optical fiber 23, but also reduces the reflection loss of the input light beams. The antireflection film 50 is not formed in the light exiting area 52. Thus, the antireflection film 50 does not affect the properties of the second optical filter 43. The second optical filter 43 transmits light beams having the first wavelength $\lambda 1$ included in the light beams (reflected light) split by the first optical filter 41 and reflects any other wavelength elements included in the light beams. As a result, the isolation of the output light beams that are output to the first output optical fiber 24 is improved without affecting the input light beams.

The antireflection film 50 is selectively formed in the light incident area 51, and the second optical filter 43 is selectively formed in the light exiting area 52.

An optical filter element 100 and a wavelength division multiplexing optical coupler 1 according to a fifth embodiment of the present invention will now be described. The fifth embodiment differs from the fourth embodiment in the structure of a first dielectric multilayer film 43A forming a second optical filter 43. A light incident area 51 of a lens 31 is covered solely by an antireflection film 50, and a light exiting area 52 is covered solely by the second optical filter 43 (refer to FIG. 27).

Figure 34:
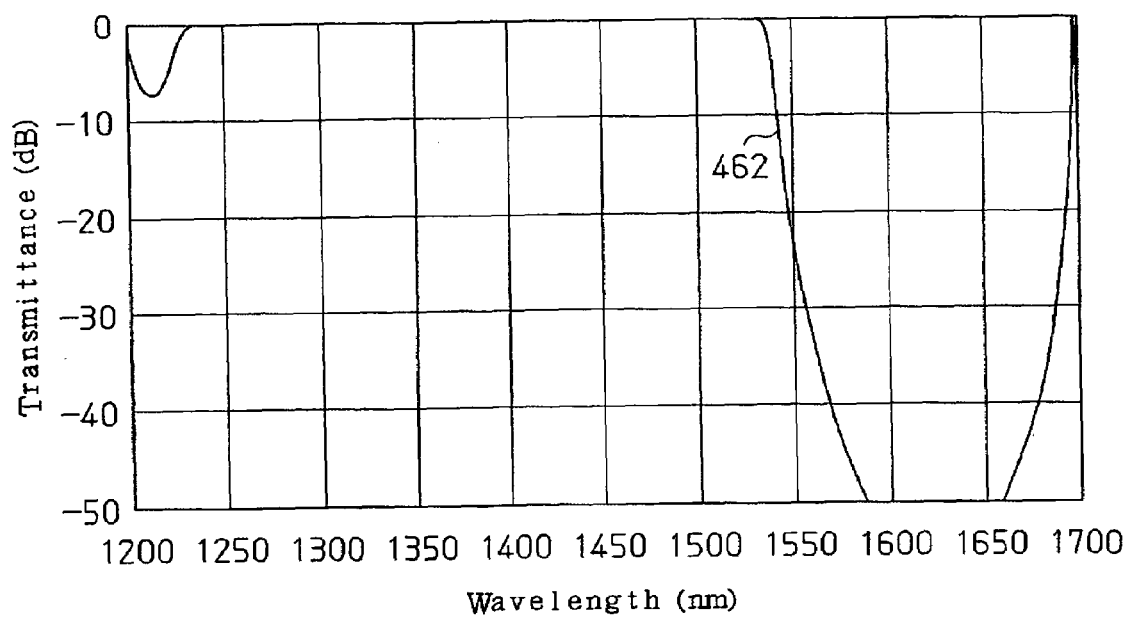
FIG. 34 is a graph showing theoretical properties of a second optical filter of the fifth embodiment.

In the fifth embodiment, the first dielectric multilayer film 43A is formed by high refractive index dielectric layers, each having an optical film thickness of λ/4, and low refractive index dielectric layers, each having an optical film thickness of 3λ/4. FIG. 34 shows theoretical properties of the optical filter 43 of the fifth embodiment.

Examples 6 to 9 according to the fifth embodiment will now be described.

The wavelength division multiplexing optical couplers 1 of examples 6 to 9 have the properties described below as their target specifications. The properties comply with B-PON standards.

Transmission isolation of 40 dB or greater (wavelength range: 1260 to 1360 nm, 1480 to 1500 nm)

Reflection isolation of 40 dB or greater (wavelength range: 1550 to 1565 nm)

Transmission insertion loss of 0.7 dB or less (wavelength range: 1260 to 1360 nm, 1480 to 1500 nm)

Reflection insertion loss of 0.7 dB or less (wavelength range: 1550 to 1565 nm)

Polarization dependent loss of 0.2 dB or less (in all the ranges above)

Figure 33:
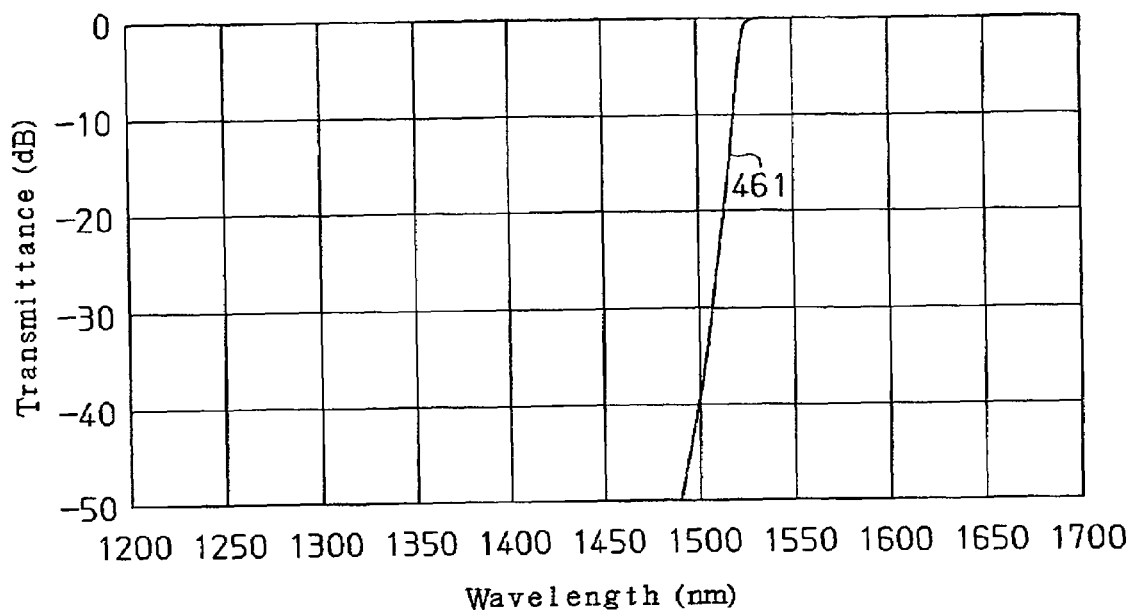
FIG. 33 is a graph showing theoretical properties of first optical filters of examples 6 to 9 according to a fifth embodiment of the present invention.

In examples 6 to 9, the first lens 31 was a gradient index rod lens having a diameter of 1.8 mm. The first optical filter 41 was an edge filter that reflected light beams having wavelengths of 1310 nm and 1490 nm, and transmitted light beams having a wavelength of 1530 nm. The first optical filter 41 was a dielectric multilayer film in which $SiO_2$ layers and $TiO_2$ layers were alternately laminated. Curve 461 in FIG. 33 shows theoretical properties of the first optical filters 41 of examples 6 to 9.

In examples 6 to 9, the second optical filter 43 was an edge filter (the first dielectric multilayer films 43A) that transmitted light beams having wavelengths of 1310 nm and 1490 nm and reflected light beams having a wavelength of 1530 nm. The second optical filter 43 was formed on a portion of the tilted first end face 31a of the first lens 31 excluding the light incident area 51. The first dielectric multilayer film 43A was a dielectric multilayer film in which high refractive index dielectric layers and low refractive index dielectric layers were alternately laminated. The high refractive index dielectric layers were composed mainly of $TiO_2$, which is a high refractive material. The low refractive index dielectric layers were composed mainly of $SiO_2$, which is a low refractive material.

Figure 36:
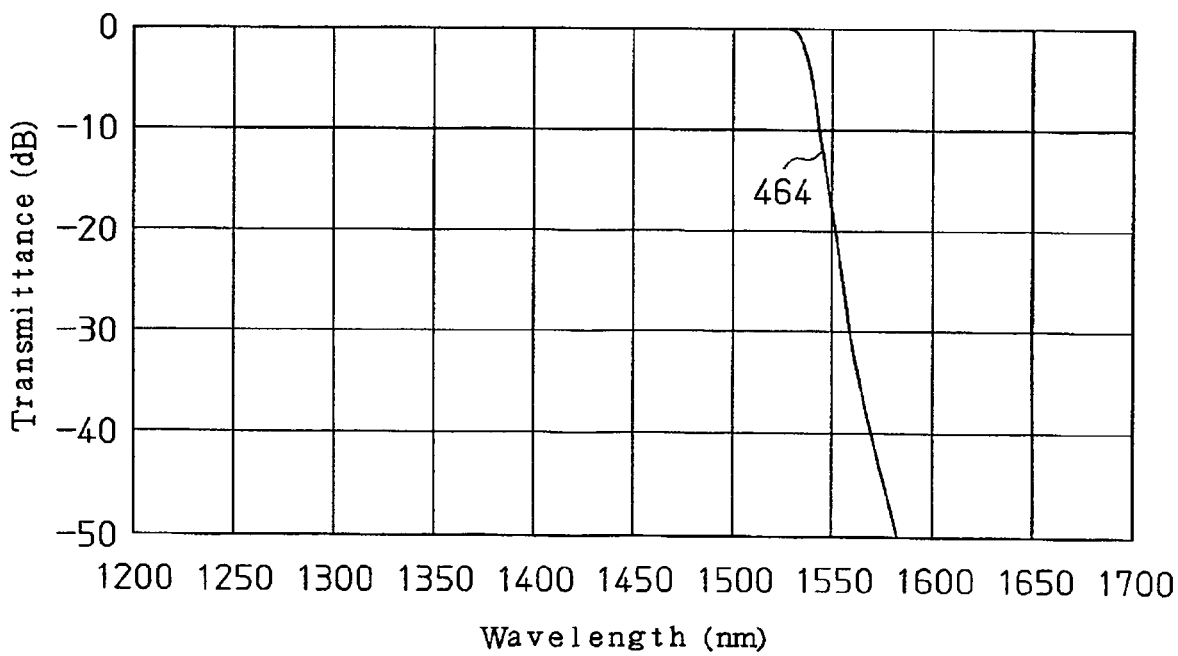
FIG. 36 is a graph showing theoretical properties of an edge filter of example 6.
Figure 37:
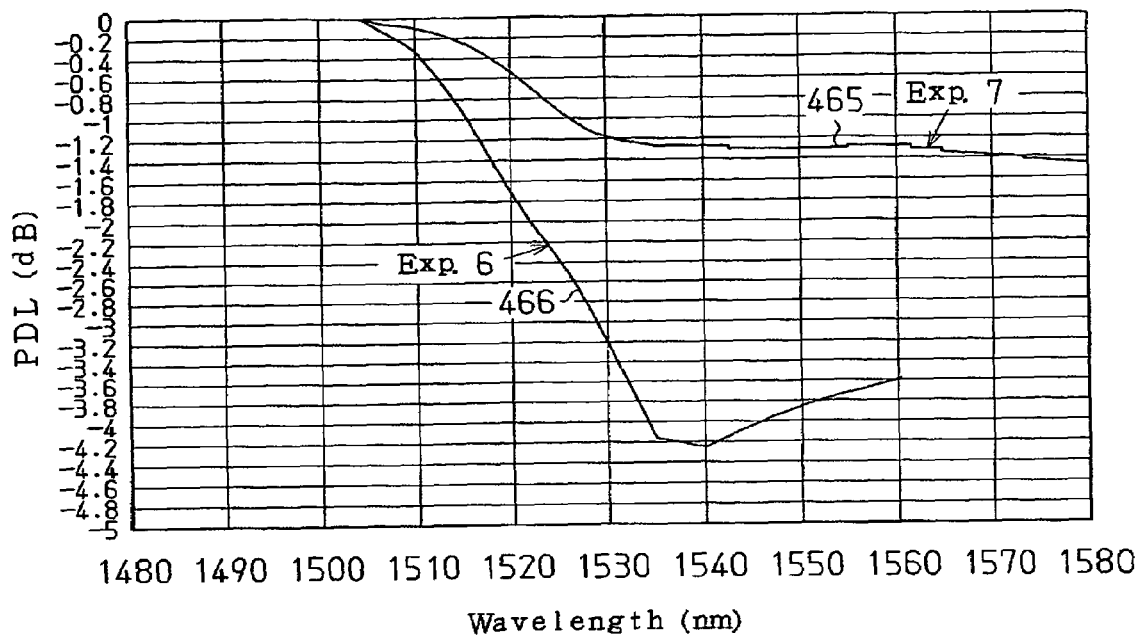
FIG. 37 is a graph showing the polarization dependent loss of examples 6 and 7.

Table 8 shows the film structure of the first dielectric multilayer film 43A of example 6. In Table 8, letter S indicates that the layer is an $SiO_2$ layer, and letter T indicates that the layer is a $TiO_2$ layer. The numerical values each show the optical film thickness of the layer (in λ/4 units). Curve 464 in FIG. 36 shows theoretical properties of the first dielectric multilayer film 43A of example 6. Curve 466 in FIG. 37 shows the polarization dependent loss of the first dielectric multilayer film 43A of example 6. The design wavelength of the first dielectric multilayer film 43A of example 6 is 1760 nm.

TABLE 8

| 1 | 0.8968S | 2 | 0.0988T | 3 | 0.5438S | 4 | 0.7993T | 5 | 0.1307S |
|---|---|---|---|---|---|---|---|---|---|
| 6 | 0.6164T | 7 | 1.0012S | 8 | 0.252T | 9 | 0.3075S | 10 | 0.9085T |
| 11 | 0.8301S | 12 | 0.0573T | 13 | 0.4395S | 14 | 1.0971T | 15 | 1.0471S |
| 16 | 1.0993T | 17 | 1.0675S | 18 | 1.0031T | 19 | 0.9898S | 20 | 1.0717T |
| 21 | 0.9998S | 22 | 1.0084T | 23 | 0.9836S | 24 | 1.0358T | 25 | 1.0003S |
| 26 | 0.9986S | 27 | 0.9997S | 28 | 1.0024T | 29 | 1.0035S | 30 | 1.0014T |
| 31 | 0.9986S | 32 | 1.0053T | 33 | 0.9762S | 34 | 1.0251T | 35 | 0.991S |
| 36 | 0.9935T | 37 | 0.998S | 38 | 1.0009T | 39 | 1.0004S | 40 | 0.9977T |
| 41 | 0.9957S | 42 | 0.9971T | 43 | 0.9999S | 44 | 1T | 45 | 0.9983S |
| 46 | 0.997T | 47 | 0.9977S | 48 | 0.9998T | 49 | 1.0007S | 50 | 1.0002T |
| 51 | 0.9987S | 52 | 0.9989T | 53 | 1.0003S | 54 | 1.0049T | 55 | 1.0056S |
| 56 | 0.9997T | 57 | 0.9961S | 58 | 1.0254T | 59 | 0.9885S | 60 | 1.0406T |
| 61 | 0.98S | 62 | 1.0292T | 63 | 1.0463S | 64 | 1.0192T | 65 | 1.0338S |
| 66 | 1.0842T | 67 | 1.1236S | 68 | 1.0482T | 69 | 0.6098S | | |

Figure 35:
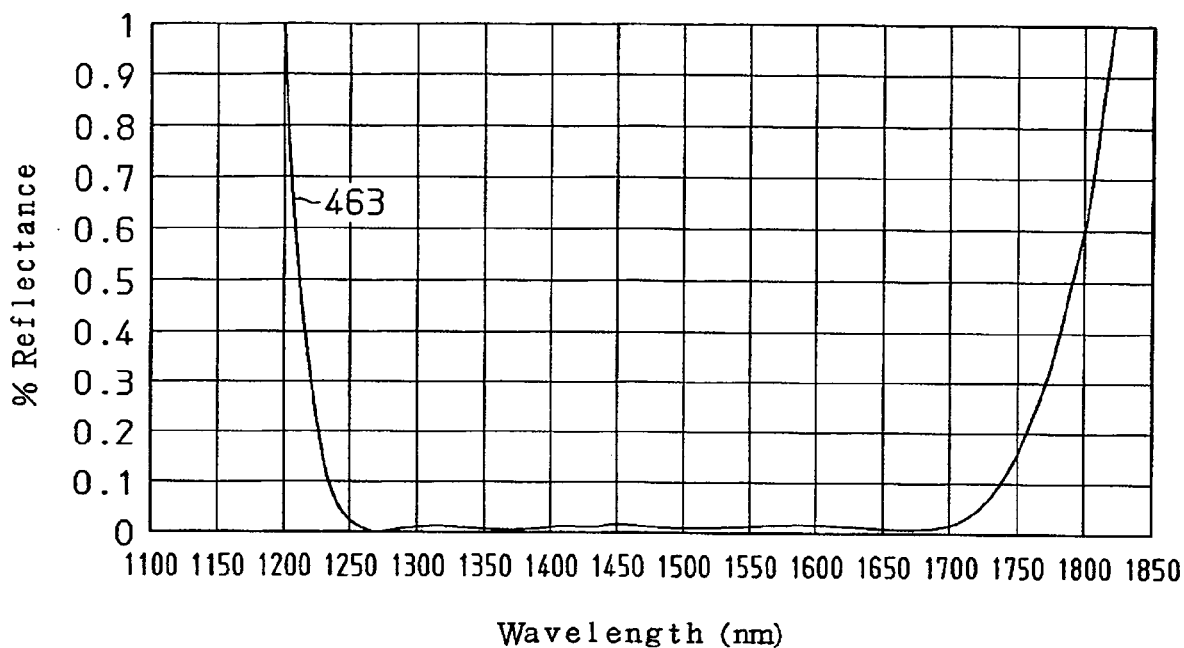
FIG. 35 is a graph showing theoretical properties of an antireflection coating of example 6.

The second dielectric multilayer film 50A was formed in the light incident area 51 on the first end face 31a. The second dielectric multilayer film 50A was formed by alternately laminating $SiO_2$ layers and $TiO_2$ layers of 11 layers in total. The theoretical properties of the second dielectric multilayer film 50A were the same as the properties shown by curve 463 in FIG. 35.

Figure 38:
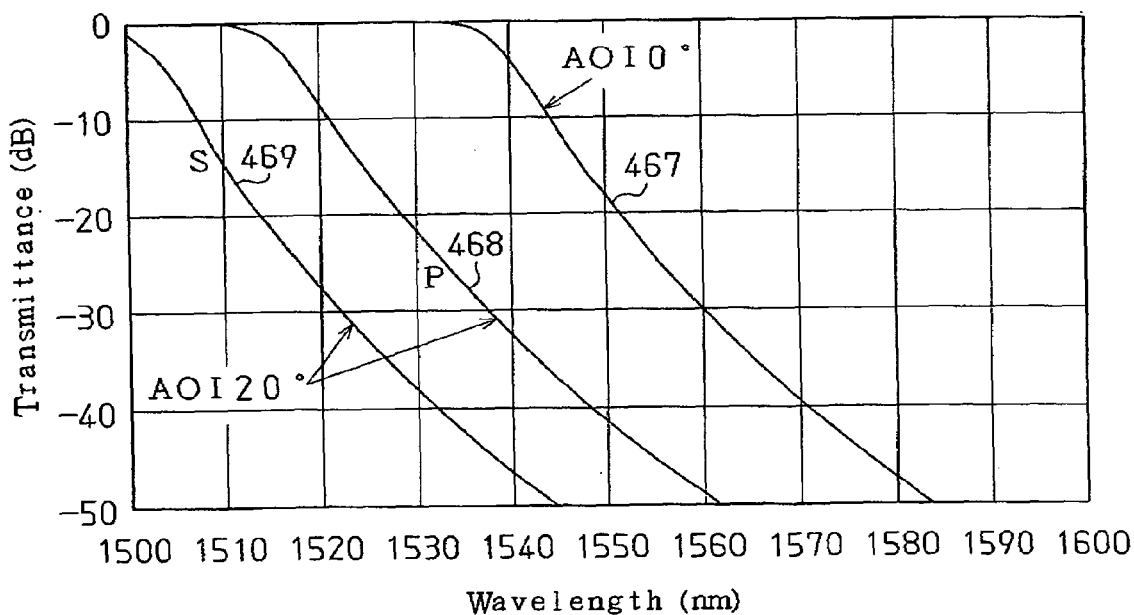
FIG. 38 is a simulation graph of the polarization dependency of example 6.

FIG. 38 is a graph showing simulation values of the polarization dependency of the optical filter 43 of example 6. In FIG. 38, curve 467 shows the polarization dependency at an angle of incident (AOI) of 0 degrees, and curves 468 and 469 respectively show the polarization dependency of P-polarization elements and the polarization dependency of S-polarization elements at an angle of incident of 20 degrees.

Table 9 shows the film thickness of the first dielectric multilayer film 43A of example 7. The design wavelength of the first dielectric multilayer film 43A of example 7 is 1760 nm. The theoretical optical properties of the dielectric multilayer film of example 7 are the same as the properties shown by curve 464 in FIG. 36. Curve 465 in FIG. 37 shows the polarization dependent loss of the first dielectric multilayer film 43A of example 7. As shown in FIG. 37, the first dielectric multilayer film 43A of example 7 has a smaller polarization dependent loss than the first dielectric multilayer film 43A of example 6.

TABLE 9

| 1 | 0.94694S | 2 | 0.10646T | 3 | 0.5804S | 4 | 0.85273T | 5 | 0.13869S |
|---|---|---|---|---|---|---|---|---|---|
| 6 | 0.65743T | 7 | 1.06782S | 8 | 0.26781T | 9 | 0.32778S | 10 | 0.96643T |
| 11 | 0.8846S | 12 | 0.05352T | 13 | 0.80238S | 14 | 3.53177T | 15 | 3.21531S |
| 16 | 2.99949T | 17 | 3.02905S | 18 | 2.92121T | 19 | 3.00507S | 20 | 2.88374T |
| 21 | 3.00546S | 22 | 2.85937T | 23 | 3.01554S | 24 | 2.83471T | 25 | 3.02905S |
| 26 | 2.81642T | 27 | 3.03933S | 28 | 2.80282T | 29 | 3.0453S | 30 | 2.799T |
| 31 | 3.04647S | 32 | 2.79675T | 33 | 3.04774S | 34 | 2.79949T | 35 | 3.04363S |
| 36 | 2.81084T | 37 | 3.03482S | 38 | 2.82816T | 39 | 3.022S | 40 | 2.85223T |

TABLE 9-continued

| 41 | 3.01221S | 42 | 2.87728T | 43 | 3.01084S | 44 | 2.91563T | 45 | 3.03336S |
|---|---|---|---|---|---|---|---|---|---|
| 46 | 2.99215T | 47 | 3.20983S | 48 | 3.50408T | 49 | 0.93109S | | |

The antireflection film 50 that is the same as that of example 6 is formed in the light incident area 51 on the first end face 31a.

Figure 39:
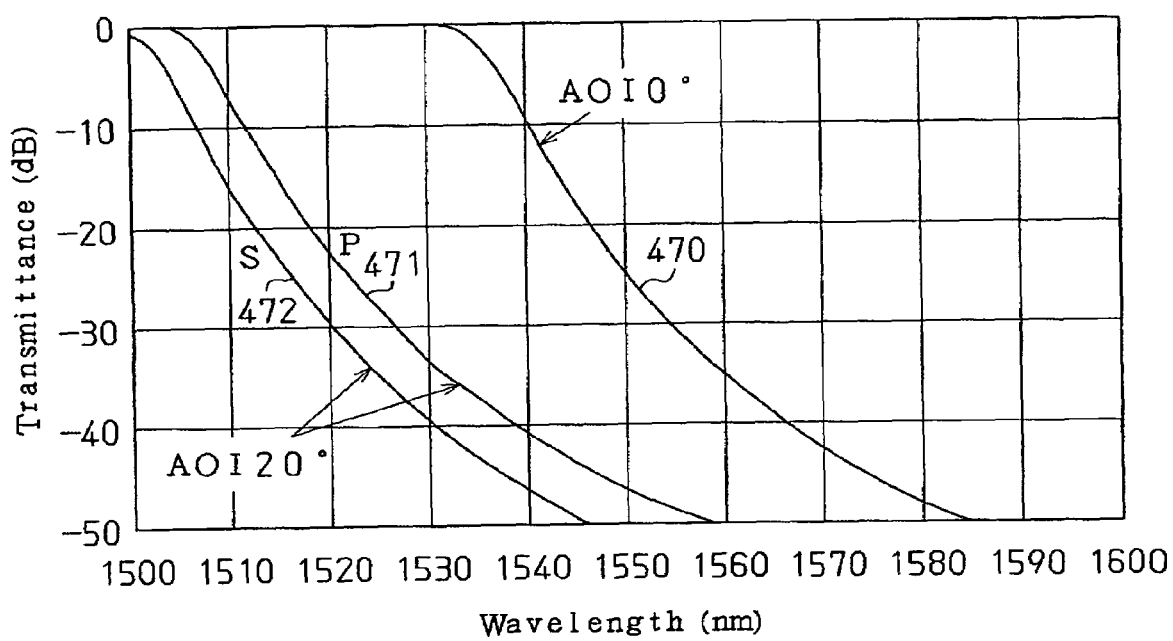
FIG. 39 is a simulation graph of the polarization dependency of a second optical filter of example 7.

FIG. 39 is a graph showing simulation values of the polarization dependency of the optical filter 43 of example 7. In FIG. 39, curve 470 shows the polarization dependency at an angle of incident of 0 degrees, and curves 471 and 472 respectively show the polarization dependency of P-polarization elements and the polarization dependency of S-polarization elements at an angle of incident of 20 degrees.

Comparing FIGS. 38 and 39, the optical filter 43 of example 7 has a smaller polarization split (polarization dependency) than the optical filter 43 of example 6.

Figure 40A:
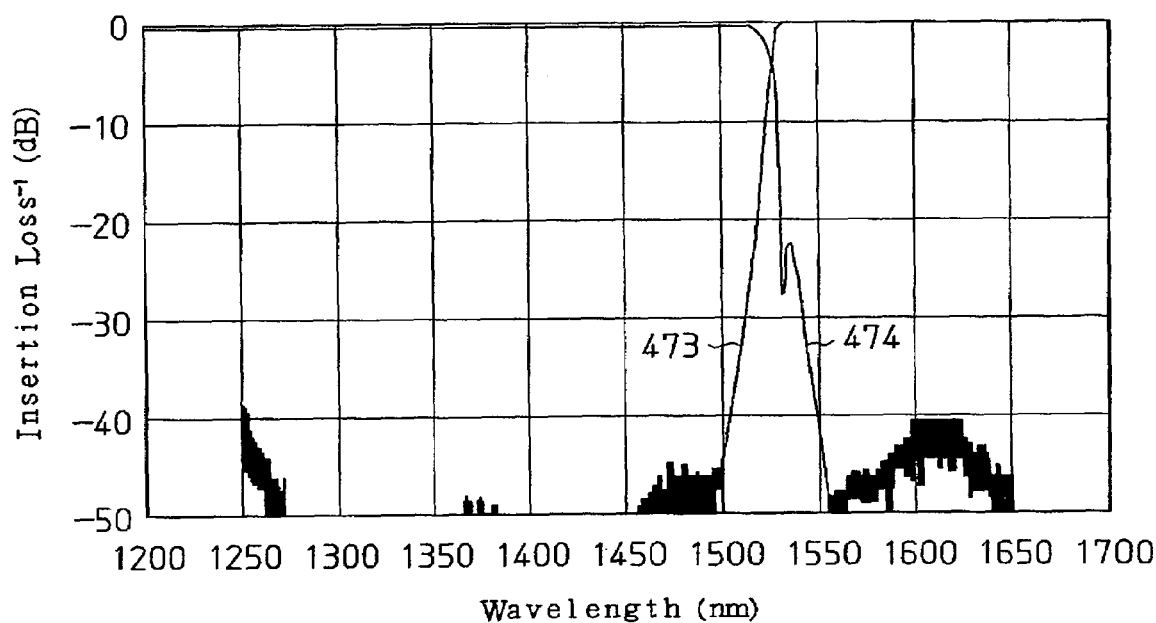
FIGS. 40A and 40B are graphs showing measurement results of the insertion loss of example 7.
Figure 40B:
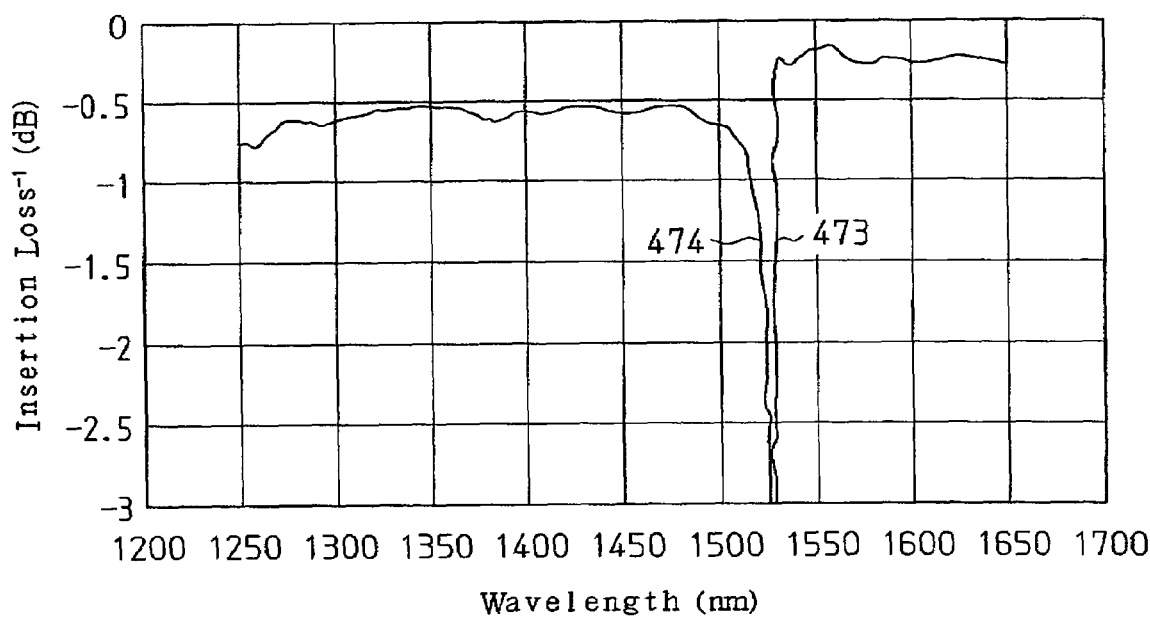

FIGS. 40A and 40B show the insertion loss of the filter-incorporating lens 33 of example 7 in which the first optical filter 41 is formed on the second end face 31b of the first lens 31 and the second optical filter 43 is formed on the first end face 31a of the first lens 31. The vertical axis in FIGS. 40A and 40B shows the inverse of the insertion loss.

Curve 473 in FIGS. 40A and 40B shows the intensity of light output from the transmitted light output port. The ratio of the intensity of light having a wavelength of 1550 nm corresponding to λ2 and the intensity of light having a wavelength of 1310 nm or 1490 nm corresponding to λ1 is 40 dB or greater. In this case, the target specification value for the transmission isolation is achieved. As shown in FIG. 40B, the insertion loss at a wavelength of 1550 nm is about 0.2 to 0.3 dB. In this case, the filter-incorporating lens 33 of example 7 achieves the target specification value for the transmission insertion loss described above.

Curve 474 shows the intensity of light output from the reflected light output port. It is apparent that the ratio of the intensity of light having a wavelength of 1310 nm or 1490 nm corresponding to λ1 and the intensity of light having a wavelength of 1550 nm corresponding to λ2 was 40 dB or greater. In this case, the target specification value of the reflection isolation was achieved. As shown in FIG. 40B, the insertion loss at a wavelength of 1310 nm or 1490 nm is about 0.3 to 0.7 dB. In this case, the filter-incorporating lens 33 of example 7 achieves the target specification value for the transmission insertion loss described above.

Figure 41:
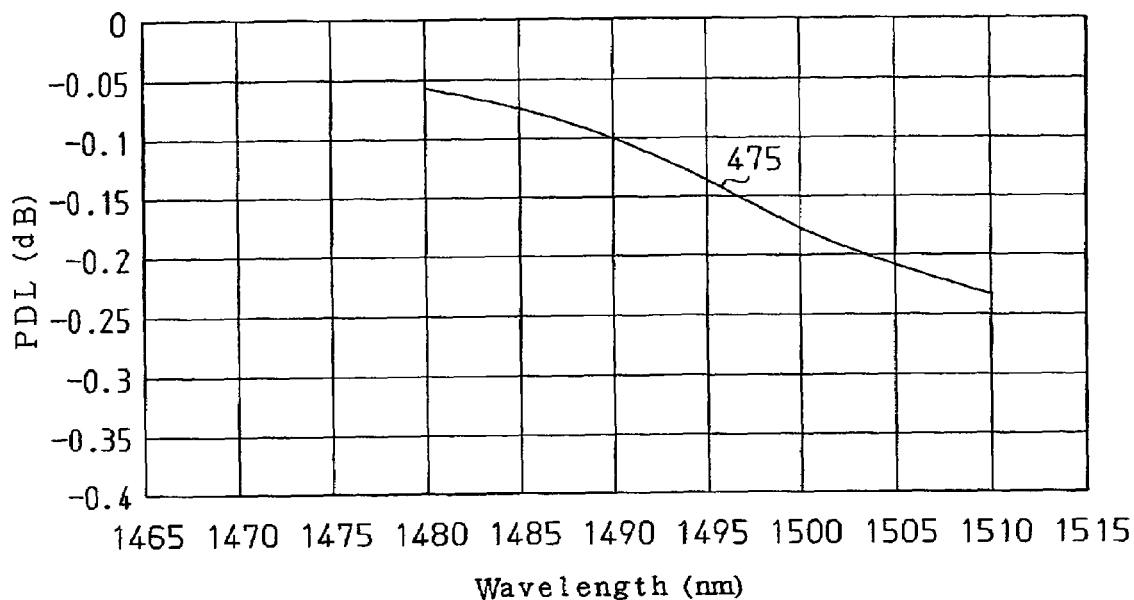
FIG. 41 is a graph showing the polarization dependent loss of example 7.

Curve 475 in FIG. 41 shows the measurement results of the polarization dependent loss of the second optical filter 43 of example 7. As shown in FIG. 41, the target specifications described above (the target specification value of the polarization dependent loss) were achieved.

Figure 42:
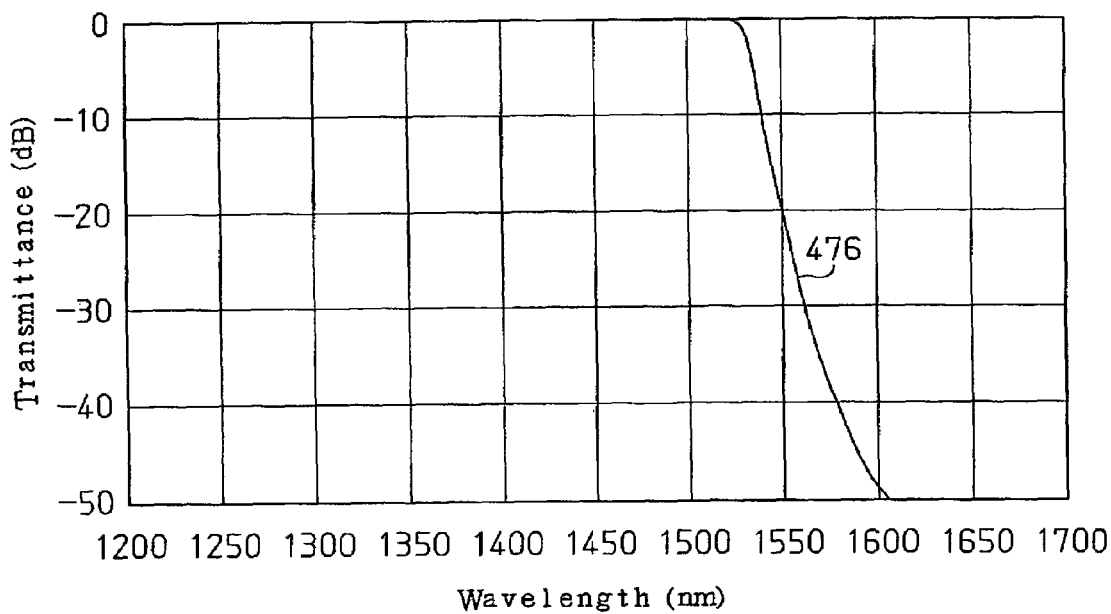
FIG. 42 is a graph showing theoretical properties of a second optical filter of example 8.

In example 8, the second optical filter 43 was the first dielectric multilayer film 43A in which high refractive index dielectric layers and low refractive index dielectric layers were alternately laminated to form 49 layers in total (Table 10). The high refractive index dielectric layers were composed mainly of $TiO_2$, which is a high refractive material. The low refractive index dielectric layers are composed mainly of $SiO_2$, which is a low refractive material. The design wavelength of the first dielectric multilayer film 43A is 1650 nm. The optical film thickness of each high refractive index dielectric layer is λ/4. The optical film thickness of each low refractive index dielectric layer is 3λ/4. Curve 476 in FIG. 42 shows theoretical properties of the first dielectric multilayer film 43A of example 8. The symbol λ represents a wavelength in the target wavelength range (nm).

TABLE 10

| 1 | 0.9515S | 2 | 0.1041T | 3 | 0.5818S | 4 | 0.8527T | 5 | 0.1368S |
|---|---|---|---|---|---|---|---|---|---|
| 6 | 0.6585T | 7 | 1.0677S | 8 | 0.268T | 9 | 0.3261S | 10 | 0.9698T |
| 11 | 0.8835S | 12 | 0.00004T | 13 | 0.93744S | 14 | 1.92922T | 15 | 3.16487S |
| 16 | 1.27438T | 17 | 2.91021S | 18 | 1.14673T | 19 | 2.96944S | 20 | 1.01845T |
| 21 | 3.13524S | 22 | 0.70789T | 23 | 3.2184S | 24 | 0.79191T | 25 | 3.13622S |
| 26 | 0.88927T | 27 | 3.08116S | 28 | 0.9056T | 29 | 3.0918S | 30 | 0.86331T |
| 31 | 3.15868S | 32 | 0.74704T | 33 | 3.22172S | 34 | 0.69946T | 35 | 3.16664S |
| 36 | 0.88744T | 37 | 3.12776S | 38 | 0.81917T | 39 | 3.16393S | 40 | 0.82471T |
| 41 | 3.10952S | 42 | 0.98686T | 43 | 2.99812S | 44 | 1.13277T | 45 | 2.92273S |
| 46 | 1.27454T | 47 | 3.22684S | 48 | 0.37321T | 49 | 0.97235S | | |

Figure 43:
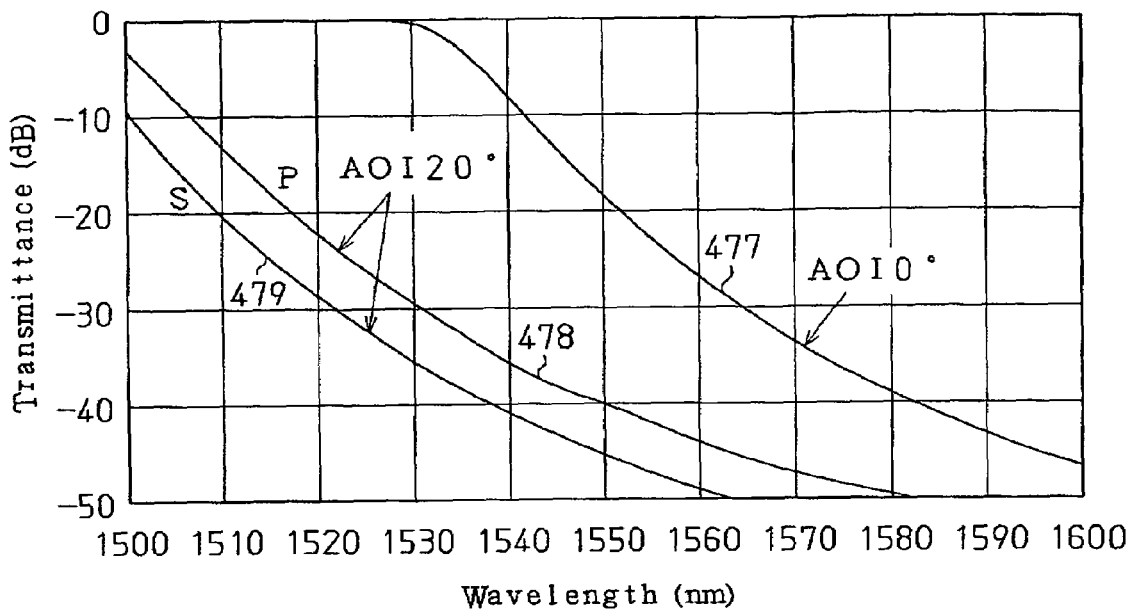
FIG. 43 is a simulation graph of the polarization dependency of a second optical filter of example 8.

FIG. 43 is a graph showing simulation values of the polarization dependency of the second optical filter 43 of example 8. In FIG. 43, curve 477 shows the transmission at an angle of incident of 0 degrees, and curves 478 and 479 respectively show the transmission of P-polarization elements and the transmission of S-polarization elements at an angle of incident of 20 degrees.

Comparing FIGS. 38 and 43, the optical filter 43 of example 8 has a smaller polarization split (polarization dependency) than the optical filter 43 of example 6. In this way, the second optical filter 43 of example 8 has an improved polarization split, and achieves the above target specifications (the target specification value for the polarization dependent loss).

Figure 44:
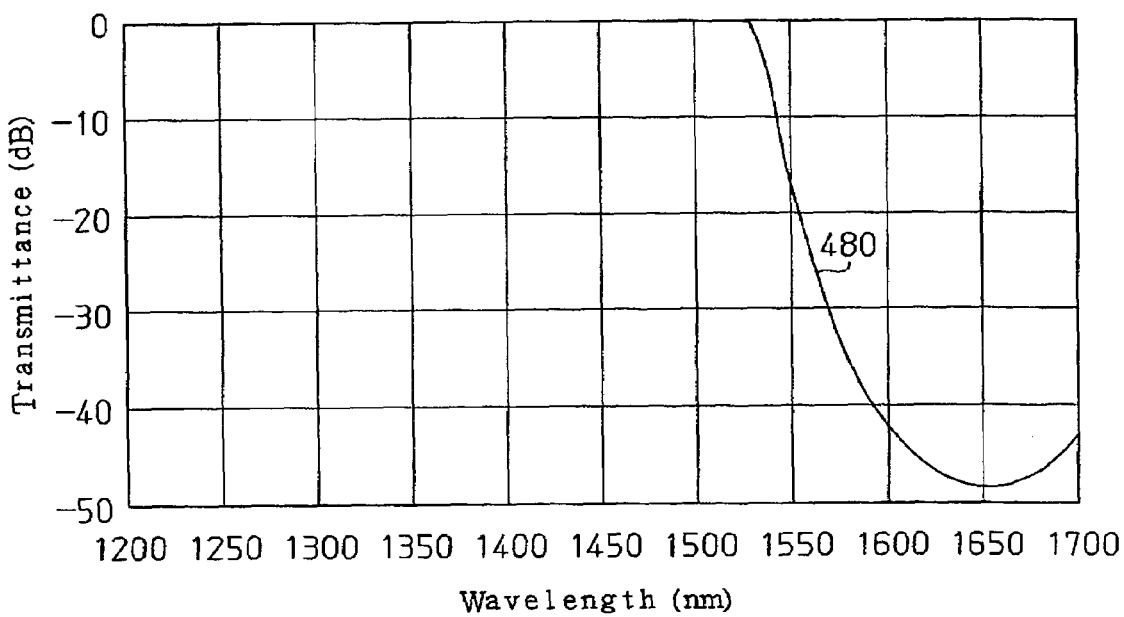
FIG. 44 is a graph showing theoretical properties of a second optical filter of example 9.

In example 9, the second optical filter 43 was the first dielectric multilayer film 43A in which high refractive index dielectric layers and low refractive index dielectric layers were alternately laminated to form 49 layers in total (Table 11). The high refractive index dielectric layers were composed mainly of $TiO_2$, which is a high refractive material. The low refractive index dielectric layers were composed mainly of $SiO_2$, which is a low refractive material. The design wavelength of the first dielectric multilayer film 43A was 1650 nm. The optical film, thickness of each high refractive index dielectric layer was, 3λ/4. The optical film thickness of each low refractive index dielectric layer was λ/4. Curve 480 in FIG. 44 shows theoretical properties for the first dielectric multilayer film 43A of example 9.

TABLE 11

| | | | | | | | | | |
|---|---|---|---|---|---|---|---|---|---|
| 1 | 0.9515S | 2 | 0.1041T | 3 | 0.5818S | 4 | 0.8527T | 5 | 0.1368S |
| 6 | 0.6585T | 7 | 1.0677S | 8 | 0.268T | 9 | 0.3261S | 10 | 0.9698T |
| 11 | 0.8835S | 12 | 0.00043T | 13 | 0.86408S | 14 | 3.48762T | 15 | 1.58551S |
| 16 | 2.81695T | 17 | 1.41483S | 18 | 2.67751T | 19 | 1.35327S | 20 | 2.70713T |
| 21 | 1.25663S | 22 | 2.8267T | 23 | 1.11298S | 24 | 2.97578T | 25 | 0.95014S |
| 26 | 3.05176T | 27 | 0.9453S | 28 | 2.96315T | 29 | 1.1224S | 30 | 2.7793T |
| 31 | 1.25621S | 32 | 2.69092T | 33 | 1.23533S | 34 | 2.83097T | 35 | 1.06817S |
| 36 | 3.04234T | 37 | 0.85226S | 38 | 3.09417T | 39 | 1.01818S | 40 | 3.3015T |
| 41 | 0.31607S | 42 | 2.99096T | 43 | 1.45256S | 44 | 2.52748T | 45 | 1.50301S |
| 46 | 2.73658T | 47 | 1.62468S | 48 | 3.53806T | 49 | 0.85678S | | |

Figure 45:
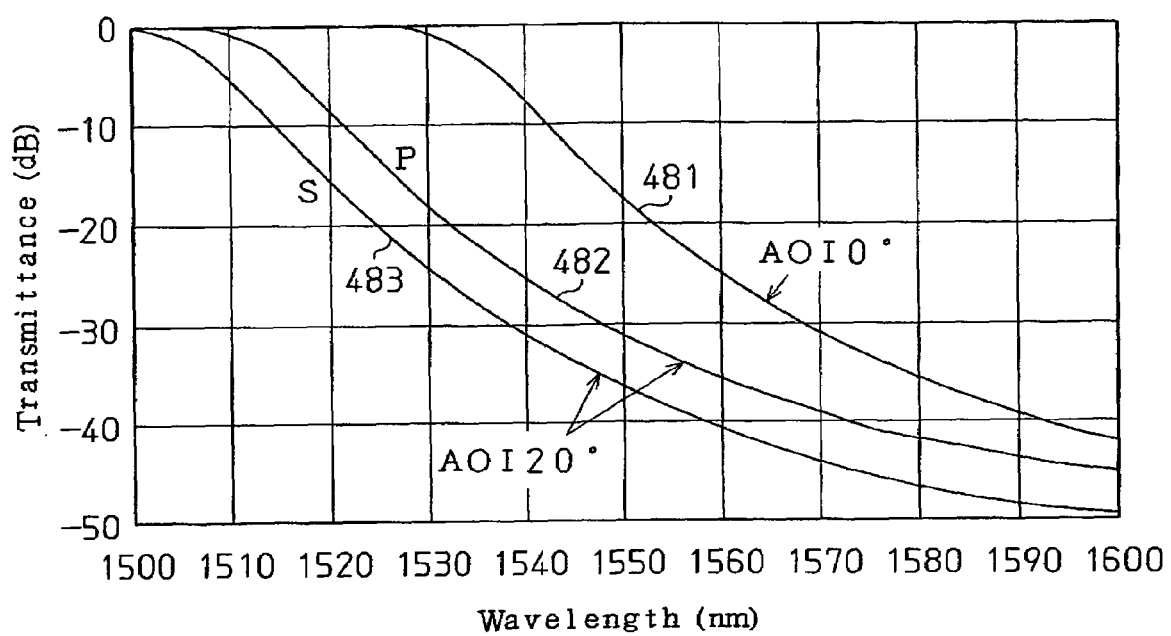
FIG. 45 is a simulation graph of the polarization dependency of a second optical filter of example 9.

FIG. 45 is a graph showing simulation values of the polarization dependency of the second optical filter 43 of example 9. In FIG. 45, curve 481 shows the transmission at an angle of incident of 0 degrees, and curves 482 and 483 respectively show the transmission of P-polarization elements and the transmission of S-polarization elements at an angle of incident of 20 degrees.

Comparing FIGS. 38 and 45, the optical filter 43 of example 9 has a smaller polarization split (polarization dependency) than the optical filter 43 of example 6. In this way, the second optical filter 43 of example 9 has an improved polarization split, and achieves the above target specifications (the target specification value of the polarization dependent loss).

As shown in FIG. 45, the second optical filter 43 of example 9 reduces the amount of change of wavelength depending on the incident angle more than the filters of examples 6 to 8. The second optical filter 43 of example 9 narrows the wavelength range in which a polarization split (polarization dependent loss) occurs. Such polarization split is caused by poor wavelength properties around the edge wavelength that are degraded when converged light beams that are reflected by the first optical filter 41 are incident on the first end face (tilted surface) 31a of the first lens 31.

In the fifth embodiment, the second optical filter 43 is formed by the first dielectric multilayer film 43A in which high refractive index dielectric layers and low refractive index dielectric layers of a large number are alternately laminated. The high refractive index dielectric layers are composed mainly of TiO$_2$, which is a high refractive material. The low refractive index dielectric layers are composed mainly of SiO$_2$, which is a low refractive material. The optical film thickness of at least either one of the high refractive index dielectric layer and the low refractive index dielectric layer is 3λ/4.

This structure reduces the polarization dependent loss of the second optical filter 43 and reduces the polarization dependency even around the edge wavelength of the transmission wavelength range.

The second optical filter 43 is formed by the first dielectric multilayer film 43A in which high refractive index dielectric layers and low refractive index dielectric layers are alternately laminated to form 49 layers in total. The high refractive index dielectric layers are composed mainly of TiO$_2$, which is a high refractive material. The low refractive index dielectric layers are composed mainly of SiO$_2$, which is a low refractive material. The optical film thickness of each high refractive index dielectric layer and the optical film thickness of each low refractive index dielectric layer are both 3λ/4. This structure reduces the polarization dependent loss of the second optical filter 43 and reduces the polarization dependency even around the edge wavelength of the transmission wavelength range.

It should be apparent to those skilled in the art that the present invention may be embodied in many other specific forms without departing from the spirit or scope of the invention. Particularly, it should be understood that the present invention may be embodied in the following forms.

In the above embodiments, the first optical filter 41 may not be directly formed on the second end face 31b of the first lens 41. For example, a filter chip in which a first lamination filter including the first optical filter 41 is formed on a main surface of a glass substrate may be used. The filter chip may be arranged between the lenses 31 and 32. It is preferable to use the filter chip when light beams of four or more wavelengths are multiplexed or demultiplexed.

In the above embodiments, the optical filter element 100 may be spaced from the first end face 31a of the first lens 31. For example, an optical filter element 100 including a second lamination filter including the second optical filter 43 and the antireflection film 50 may be arranged between the end face of the first output optical fiber 24 and the first end face 31a of the first lens 31. The optical filter element 100 may be arranged to be tilted with respect to the optical axis of the input light beams.

In the above embodiments, the coupler 1 may output an optical signal of a wavelength of 1550 nm from the first output optical fiber 24 and an optical signal of a wavelength of 1310 nm or 1490 nm from the second output optical fiber 26.

The optical filters 41 and 43 may be bandpass filters. The predetermined wavelength range is defined by the edge wavelength at one edge when the optical filters 41 and 43 are edge filters. The predetermined wavelength range is defined by the wavelengths at two edges when the optical filters 41 and 43 are bandpass filters. The usable wavelengths of the optical filters 41 and 43 should not be limited to two wavelengths (λ1 and λ2), but may be three or more wavelengths. Examples of the usable wavelengths include wavelength ranges of 1260 to 1360 nm, 1480 to 1500 nm, and 1550 to 1569 nm.

In the above embodiments, the coupler 1 may be a demultiplexer for demultiplexing wavelength division multiplexed light beams, or may be a multiplexer for multiplexing optical input signals of two wavelengths and outputting them as a single optical fiber. When the coupler 1 is used as a multiplexer, input optical signals are input from the optical fibers 24 and 26, and output signals are output from the optical fiber 23.

In the above embodiments, the wavelength division multiplexing optical coupler 1 may be incorporated not only in an OLT and an ONU, but also in optical electronic devices of a wide range including an O/E (optical/electrical) converter and an E/O (electrical/optical) converter.

In the prior art, to enable optical signals of three or more wavelengths to be multiplexed or demultiplexed, a plurality of three-port couplers having different transmission wavelength ranges are connected (cascaded) (Japanese Laid-Open Patent Publication No. 54-17044). However, cascading two or more optical couplers requires complicated arrangement of an optical fiber. To avoid light loss, such an optical fiber for connection needs to be wound with a relatively large diameter. An optical fiber wound to have a large diameter needs a case. As a result, the size of the coupler increases. To solve this problem, U.S. Pat. No. 4,474,424 describes a technique for placing a plurality of edge filters having different edge wavelengths on top of each other. The plurality of edge filters are tilted at different angles. The plurality of edge filters reflect light beams in different directions. As a result, the light beams having different wavelengths are coupled in the different optical fibers. However, the optical coupler described in the '424 patent fails to improve isolation of its reflected light output port.

The above embodiments of the present invention are also applicable to an optical coupler having a first lamination filter including edge filters with a plurality of edge wavelengths laminated each other for multiplexing and demultiplexing optical signals of three or more wavelengths. The above embodiments of the present invention provide a compact and low-cost wavelength division multiplexing optical coupler that reduces reflection loss and increases isolation of a port outputting reflected light beams of each edge filter.

More specifically, the above embodiments describe the structure using only the first optical filter 41 as an optical filter included in the first lamination filter. However, the present invention is also applicable to the structure in which the first lamination filter includes a plurality of optical filter layers that are arranged in a manner that the transmission wavelength ranges of the optical filter layers become narrower in the traveling direction of collimated light beams. In this case, the plurality of optical filter layers included in the first lamination filter are tilted at different angles with respect to the optical axis of the first lens 31 and are arranged directly on or are spaced from the second end face 31b. This arrangement enables the optical filter layers to reflect optical signals of a plurality of wavelengths included in the collimated light beams output from the first lens 31 in different directions. In this case, the light beams reflected by the plurality of optical filters are focused on the end faces of the corresponding output optical fibers 24. This structure enables an optical signal of each wavelength to be split from the input light beams (wavelength division multiplexed signals), in which optical signals of three or more wavelengths are multiplexed, and to be allocated to an optical fiber arranged in the corresponding port.

When the second end face 31b of the first lens 31 is flat, the optical filter closest to the second end face 31b among the plurality of optical filters included in the first lamination filter, for example, the first optical filter 41, is easily placed in contact with the second end face 31b.

The end faces 31a and 31b of the first lens 31 are easily formed as tilted surfaces. Thus, the filter-incorporating lens 33 is manufactured easily. The filter-incorporating lens 33 reduces the number of components of the coupler 1. As a result, the coupler 1 is easily assembled.

In the above embodiments, the dual optical fiber pigtail 21 may be a multiple optical fiber pigtail including three or more optical fibers. The single optical fiber pigtail 22 may be a multiple optical fiber pigtail.

In the above embodiments, the optical filter layer closest to the end face 32a of the second lens 32 among the plurality of optical filter layers included in the first lamination filter may be placed in contact with the end face 32a. In this case, a flat-sheet optical filter layer is easily placed in contact with the end face 32a of the second lens 32. When the second lens 32 includes the end face 32a that is tilted at a predetermined angle, the angle of the optical filter layer is adjusted to a predetermined value by placing the optical filter layer in contact with the tilted end face 32a.

When the first filter 41 is a dielectric multilayer film that is placed in contact with the end face 32a of the second lens 32, the filter-covered rod lens 33 can be easily mass-manufactured.

In the above embodiments, the lenses 31 and 32 may be converging lenses other than gradient index rod lenses. When the lenses 31 and 32 have spherical or non-spherical lens surfaces, an optical filter element may be used in which the second optical filter 43 and the antireflection film 50 are formed on separate substrates.

In the above embodiments, the first lens 31 may be a plano-convex lens. In this case, the optical filter element 100 may be placed in contact with the first end face 31a or may be formed directly on the first end face 31a.

The present examples and embodiments are to be considered as illustrative and not restrictive, and the invention is not to be limited to the details given herein, but may be modified within the scope and equivalence of the appended claims.

What is claimed is:

1. An optical filter element having a target wavelength range and for use with a rod lens having an end face that includes a first area and a second area, the optical filter element comprising:
   a first dielectric multilayer film arranged in the first area of the end face of the rod lens; and
   a second dielectric multilayer film arranged in at least the second area of the end face of the rod lens, wherein the second dielectric multilayer film has a reflectance of a predetermined value or less for a light beam having a wavelength in the target wavelength range, and a portion of the second dielectric multilayer film and a portion of the first dielectric multilayer film are laminated with each other;
   wherein the first and second dielectric multilayer films each includes a first portion;
   the first area is covered by a laminated structure of the first portion of the first dielectric multilayer film and the first portion of the second dielectric multilayer film;
   the second dielectric multilayer includes a second portion; and
   the second area is covered only by the second portion of the second dielectric multilayer film.

2. The optical filter element according to claim 1, wherein:
   the end face of the rod lens has a third area, and the first dielectric multilayer film includes a second portion;
   the third area is covered only by the second portion of the first dielectric multilayer film.

3. The optical filter element according to claim 1, wherein:
   the light beam has an optical axis;
   the first dielectric multilayer film has a surface that is tilted with respect to the optical axis of the light beam;
   the first dielectric multilayer film has a laminated structure of high refractive index dielectric layers and low refractive index dielectric layers that are alternately laminated with each refractive index dielectric layer having an optical film thickness; and a sum of the optical film thickness of one of the high refractive index dielectric layers and the optical film thickness of adjacent one of the low refractive index dielectric layers is $\lambda/2$; and each high refractive index dielectric layer has an optical film thickness that is greater than $\lambda/4$ and less than $\lambda/2$, where $\lambda$ represents a wavelength in the target wavelength range.

4. The optical filter element according to claim 1, wherein:

the light beam has an optical axis;

the first dielectric multilayer film has a surface that is tilted with respect to the optical axis of the light beam;

the first dielectric multilayer film has a laminated structure of high refractive index dielectric layers and low refractive index dielectric layers that are alternately laminated; and at least either one of each high refractive index dielectric layer and each low refractive index dielectric layer has an optical film thickness of at least $3\lambda/4$, where $\lambda$ represents a wavelength in the target wavelength range.

5. The optical filter element according to claim 1, wherein:

the rod lens is a gradient index rod lens including a tilted surface; and the first dielectric multilayer film is formed on the tilted surface of the gradient index rod lens.

6. The optical filter element according to claim 1, wherein the first area is adjacent to the second area.

7. The optical filter element according to claim 6, wherein the first area is spaced from the second area by approximately 100 μm.

8. The optical filter element according to claim 1, wherein:

the second dielectric multilayer film functions as an antireflection film at a second position;

the first dielectric multilayer film and the second dielectric multilayer film are laminated with each other at a first position to form a filter layer, with the filter layer having two surfaces; and the second dielectric multilayer film functions as one of the two surfaces of the filter layer.

9. The optical filter element according to claim 8, wherein:

the filter layer transmits or reflects a light beam having a wavelength in the target wavelength range; and the antireflection film prevents the light beam having said wavelength in the target wavelength range from being reflected.

10. The optical filter element according to claim 8, wherein the first dielectric multilayer film is arranged between the portion of the second dielectric multilayer film and the end face of the rod lens.

11. The optical filter element according to claim 8, wherein the second dielectric multilayer film is entirely in contact with the end face of the rod lens.

12. The optical filter element according to claim 1, wherein the optical filter element is incorporated in a wavelength division multiplexing optical coupler.

13. A wavelength division multiplexing optical coupler for connection to an input optical fiber for receiving an input light beam into which a plurality of optical signals of different specific wavelengths are multiplexed through an end face of the input optical fiber, and demultiplexing the input light beam into the plurality of optical signals, and allocates the plurality of optical signals to a plurality of output optical fibers, the wavelength division multiplexing optical coupler comprising:

a first lens, optically coupled to the end face of the input optical fiber, for converting the input light beam into a collimated light beam, the first lens having a first surface, including a light incident area for receiving the input light beam, and a second surface for exiting the collimated light beam;

a first lamination filter arranged on the second surface of the first lens and including a first optical filter for reflecting a light beam having a first wavelength of a plurality of wavelengths toward the first surface of the first lens, wherein the light beam having the first wavelength that is reflected by the first optical filter is emitted from a light exiting area that is formed on the first surface of the first lens and focused at a first position;

a first output optical fiber optically coupled to the first surface of the first lens, the first output optical fiber including an end face arranged at the first position for receiving the light beam that is focused; and an optical filter element arranged between the end face of the first output optical fiber and the first surface of the first lens, the optical filter element comprising:
  (i) a first dielectric multilayer film arranged in the first area of the surface of the transparent substrate: and
  (ii) a second dielectric multilayer film arranged in at least the second area of the surface of the transparent substrate, wherein the second dielectric multilayer film has a reflectance of a predetermined value or less for a light beam having a wavelength in the target wavelength range, and a portion of the second dielectric multilayer film and a portion of the first dielectric multilayer film are laminated with each other;

wherein the first dielectric multilayer film of the optical filter element is arranged in the light exiting area, and the second dielectric multilayer film of the optical filter element is formed in the light incident area.

14. The wavelength division multiplexing optical coupler according to claim 13, wherein:

the second dielectric multilayer film of the optical filter element is arranged in the light exiting area and the light incident area; and the first dielectric multilayer film and the second dielectric multilayer film are laminated with each other in the light exiting area to form a second filter, the second filter transmitting the light beam having the first wavelength and reflecting a light beam that does not have the first wavelength.

15. The wavelength division multiplexing optical coupler according to claim 13, wherein:

the second dielectric multilayer film of the optical filter element is formed directly and entirely on the first surface, and a portion of the second dielectric multilayer film formed in the light incident area functions as an antireflection film for preventing reflection loss of the input light beam;

the first dielectric multilayer film is formed on the second dielectric multilayer film in the light exiting area; and the first dielectric multilayer film and the second dielectric multilayer film are laminated with each other in the light exiting area to form a second filter, the second filter transmitting the light beam having the first wavelength and reflecting a light beam that does not have the first wavelength.

16. The wavelength division multiplexing optical coupler according to claim 13, wherein the light incident area is devoid of the first dielectric multilayer film, and the light exiting area is devoid of the second dielectric multilayer film.

17. The wavelength division multiplexing optical coupler according to claim 16, wherein the first dielectric multilayer film covers the first surface except for the light incident area, and the second dielectric multilayer film covers the first surface except for the light exiting area.

18. The wavelength division multiplexing optical coupler according to claim 16, wherein the second dielectric multilayer film is placed on the first dielectric multilayer film on a portion of the first surface excluding the light incident area and the light exiting area.

19. The wavelength division multiplexing optical coupler according to claim 13, wherein:
the light beam has an optical axis;
the first dielectric multilayer film has a surface that is tilted with respect to the optical axis of the light beam;
the first dielectric multilayer film has a laminated structure of high refractive index dielectric layers and low refractive index dielectric layers that are alternately laminated with each refractive index dielectric layer having an optical film thickness; and
the optical film thickness of the high refractive index dielectric layers summed with the optical film thickness of the low refractive index dielectric layers is $\lambda/2$; and
each high refractive index dielectric layer has an optical film thickness that is greater than $\lambda/4$ and less than $\lambda/2$, where $\lambda$ represents a wavelength in the target wavelength range.

20. The wavelength division multiplexing optical coupler according to claim 13, wherein:
the light beam has an optical axis;
the first dielectric multilayer film has a surface that is tilted with respect to the optical axis of the light beam;
the first dielectric multilayer film has a laminated structure of high refractive index dielectric layers and low refractive index dielectric layers that are alternately laminated; and
at least either one of each high refractive index dielectric layer and each low refractive index dielectric layer has an optical film thickness of at least $3\lambda/4$, where $\lambda$ represents a wavelength in the target wavelength range.

21. The wavelength division multiplexing optical coupler according to claim 13, wherein the first surface of the first lens is flat, and the optical filter element is in contact with the first surface.

22. The wavelength division multiplexing optical coupler according to claim 21, wherein the first lens is a gradient index rod lens.

23. The wavelength division multiplexing optical coupler according to claim 13, wherein:
the first lens has an optical axis;
the first lamination filter includes a plurality of optical filter layers, each having a transmission wavelength range, the plurality of optical filter layers being laminated in a manner that the transmission wavelength ranges of the layers become narrower in the direction of travel of the collimated light beam, arranged on a side of the second surface at different angles with respect to the optical axis of the first lens, and reflect optical signals of a plurality of wavelengths included in the collimated light beam in a plurality of directions; and
the first output optical fiber is one of a plurality of output optical fibers having a plurality of end faces arranged at a plurality of positions where reflected light beams from the plurality of optical filter layers included in the first lamination filter are coupled.

24. The wavelength division multiplexing optical coupler according to claim 13, further comprising:
a second lens optically coupled to the first lens, wherein the second lens has a third surface, for receiving a light beam transmitted through each of the optical filter layers in the first lamination filter, and a fourth surface, for focusing and exiting the transmitted light beam at a second position; and
a second output optical fiber optically coupled to the second lens and having an end face at the second position.

25. The wavelength division multiplexing optical coupler according to claim 24, wherein:
the plurality of optical signals include an optical signal of a first wavelength and an optical signal of a second wavelength; and
the first optical filter reflects the optical signal of the first wavelength and transmits the optical signal of the second wavelength.

26. The wavelength division multiplexing optical coupler according to claim 13, wherein the first dielectric multilayer film is arranged between the portion of the second dielectric multilayer film and the surface of the transparent substrate.

27. The wavelength division multiplexing optical coupler according to claim 13, wherein the second dielectric multilayer film is entirely in contact with the surface of the transparent substrate.

28. The wavelength division multiplexing optical coupler according to claim 13, wherein each of the first wavelength and the second wavelength corresponds to one of wavelength ranges of 1260 to 1360 nm, 1480 to 1500 nm, and 1550 to 1560 nm.

29. A method for manufacturing the wavelength division multiplexing optical coupler according to claim 13, the method comprising:
preparing the first lens;
arranging the first lamination filter on the second surface of the first lens;
optically coupling the first output optical fiber to the first surface of the first lens; and
arranging the optical filter element between the end face of the first output optical fiber and the first surface of the first lens, wherein said arranging the optical filter element includes:
covering the light incident area of the first surface of the first lens with a mask;
forming the first dielectric multilayer film on a portion of the first surface excluding the light incident area;
selectively removing the mask and a portion of the first dielectric multilayer film formed on the mask at the same time and selectively exposing the light incident area of the first surface; and
forming the second dielectric multilayer film functioning as an antireflection film on the first dielectric multilayer film throughout the entire first surface.

30. A method for manufacturing the wavelength division multiplexing optical coupler according to claim 14, the method comprising:
preparing the first lens;
arranging the first lamination filter on the second surface of the first lens;
optically coupling the first output optical fiber to the first surface of the first lens; and arranging the optical filter element between the end face of the first output optical fiber and the first surface of the first lens, wherein said arranging the optical filter element includes:

forming the second dielectric multilayer film on the entire first surface of the first lens;

covering the second dielectric multilayer film on the first surface of the first lens at a portion corresponding to the light incident area with a mask;

forming the first dielectric multilayer film covering the mask and the second dielectric multilayer film, wherein the first dielectric multilayer film includes a first portion covering the mask and a second portion covering the second dielectric multilayer film; and selectively removing the mask and the first portion of the first dielectric multilayer film formed on the mask at the same time.

31. A method for manufacturing the wavelength division multiplexing optical coupler according to claim 16, the method comprising:

preparing the first lens;

arranging the first lamination filter on the second surface of the first lens;

optically coupling the first output optical fiber to the first surface of the first lens; and arranging the optical filter element between the end face of the first output optical fiber and the first surface of the first lens, wherein arranging the optical filter element includes:

covering the light incident area of the first surface of the first lens with a first mask;

forming the first dielectric multilayer film on the first mask and the first surface of the first lens;

selectively removing the first mask and a portion of the first dielectric multilayer film formed on the first mask at the same time and selectively exposing the light incident area of the first surface;

covering the first dielectric multilayer film at a first portion corresponding to the light exiting area of the first surface with a second mask;

forming the second dielectric multilayer film on the second mask and the first dielectric multilayer film; and selectively removing the second mask and a portion of the second dielectric multilayer film formed on the second mask at the same time and selectively exposing the first portion of the second dielectric multilayer film.

* * * * *